(12) United States Patent
Hashimoto et al.

(10) Patent No.: US 10,613,113 B2
(45) Date of Patent: Apr. 7, 2020

(54) POSITION DETECTING DEVICE

(71) Applicant: SMC CORPORATION, Chiyoda-ku (JP)

(72) Inventors: Kiyoshi Hashimoto, Fujinomiya (JP); Katsuhisa Endo, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 511 days.

(21) Appl. No.: 15/629,084

(22) Filed: Jun. 21, 2017

(65) Prior Publication Data

US 2017/0370961 A1 Dec. 28, 2017

(30) Foreign Application Priority Data

Jun. 27, 2016 (JP) .................................. 2016-126346
Jun. 5, 2017 (JP) .................................. 2017-110919

(51) Int. Cl.
*G01P 13/04* (2006.01)
*G01P 1/10* (2006.01)
(Continued)

(52) U.S. Cl.
CPC ............ *G01P 13/045* (2013.01); *G01D 5/145* (2013.01); *G01D 5/2497* (2013.01); *G01P 1/10* (2013.01);
(Continued)

(58) Field of Classification Search
CPC .......... G01P 13/00; G01P 13/02; G01P 13/04; G01P 13/0045; G01P 3/00; G01P 3/42; G01P 3/44; G01P 3/48; G01P 3/4802; G01P 3/481; G01P 3/487; G01P 1/00; G01P 1/07; G01P 1/08; G01P 1/10; G01P 1/103; G01P 1/11; G01D 5/00; G01D 5/12; G01D 5/14;
(Continued)

(56) References Cited

U.S. PATENT DOCUMENTS 4,928,046 A * 5/1990 Karasawa .............. G01D 5/243
310/111
5,147,989 A * 9/1992 Ito ............................ B60S 1/08
200/11 R
(Continued)

FOREIGN PATENT DOCUMENTS

JP 64-23107 1/1989
JP 2002-513923 5/2002
(Continued)

*Primary Examiner* — Hoai-An D. Nguyen
(74) *Attorney, Agent, or Firm* — Oblon, McClelland, Maier & Neustadt, L.L.P.

(57) ABSTRACT

At a time that a position detecting device is initiated, an arithmetic processing unit calculates the absolute position of a rotating shaft at the time of initiation, on the basis of first to third analog signals corresponding to first to third angles of rotation, which are detected respectively by first to third rotational angle detectors. During rotation of the rotating shaft, a current position counter detects a current absolute position of the rotating shaft by counting a number of pulses of forward rotation pulses or reverse rotation pulses, corresponding to the first angle of rotation detected by the first rotational angle detector, taking as a standard a total number of pulses corresponding to the absolute position of the rotating shaft at the time of initiation.

12 Claims, 14 Drawing Sheets

(51) Int. Cl.
  *G01P 3/48* (2006.01)
  *G01D 5/14* (2006.01)
  *G01D 5/249* (2006.01)
  *G01P 3/487* (2006.01)
  *G01P 1/11* (2006.01)
  *G01P 13/00* (2006.01)

(52) U.S. Cl.
  CPC ............... *G01P 1/103* (2013.01); *G01P 1/11* (2013.01); *G01P 3/4802* (2013.01); *G01P 3/487* (2013.01); *G01P 13/00* (2013.01); *G01P 13/04* (2013.01)

(58) Field of Classification Search
  CPC ........ G01D 5/142; G01D 5/145; G01D 5/244; G01D 5/249; G01D 5/2497
  USPC ....... 324/200, 207.11, 207.25; 73/1.01, 1.79, 73/114.01, 114.26
  See application file for complete search history.

(56) References Cited

U.S. PATENT DOCUMENTS

| | | | |
|---|---|---|---|
| 6,542,088 B1 | 4/2003 | Bielski et al. | |
| 2002/0003411 A1* | 1/2002 | Okai | B60S 1/08 318/445 |
| 2006/0192517 A1* | 8/2006 | Miyashita | H02P 6/17 318/652 |
| 2009/0140731 A1* | 6/2009 | Miyashita | G01D 5/145 324/207.25 |
| 2010/0281667 A1* | 11/2010 | Aisaki | F16H 59/105 29/281.1 |
| 2011/0282552 A1* | 11/2011 | Gebregergis | B62D 5/0418 701/42 |
| 2011/0316530 A1* | 12/2011 | Fukui | G01B 7/30 324/207.25 |
| 2012/0215353 A1* | 8/2012 | Izumi | B25J 9/1641 700/254 |
| 2013/0169270 A1* | 7/2013 | Delbaere | G01B 7/30 324/207.25 |
| 2014/0084840 A1* | 3/2014 | Osaka | G05B 19/404 318/632 |
| 2016/0069449 A1* | 3/2016 | Kanai | F16H 57/08 475/158 |
| 2018/0231400 A1* | 8/2018 | Okumura | G01D 5/2451 |
| 2019/0109549 A1* | 4/2019 | Odagiri | H02K 24/00 |

FOREIGN PATENT DOCUMENTS

| | | |
|---|---|---|
| JP | 2003-161641 | 6/2003 |
| JP | 2007-78459 | 3/2007 |
| JP | 2012-145380 | 8/2012 |
| JP | 2013-164316 | 8/2013 |

* cited by examiner

POSITION DETECTING DEVICE

CROSS-REFERENCE TO RELATED APPLICATIONS

This application is based upon and claims the benefit of priority from Japanese Patent Applications No. 2016-126346 filed on Jun. 27, 2016 and No. 2017-110919 filed on Jun. 5, 2017, the contents all of which are incorporated herein by reference.

BACKGROUND OF THE INVENTION

Field of the Invention

The present invention relates to a position detecting device which, in the event that a speed reducing mechanism is connected to a rotating shaft of a rotating body, is adapted to detect an absolute position of the rotating shaft based on an angle of rotation of the rotating shaft and an angle of rotation of an output shaft of the speed reducing mechanism.

Description of the Related Art

Heretofore, a position detecting device for detecting an absolute position of a rotating shaft of a rotating body has been installed on an electric actuator or the like equipped with a rotating body such as a motor or the like. This type of position detecting device is disclosed, for example, in Japanese Laid-Open Patent Publication No. 2013-164316, Japanese Laid-Open Patent Publication No. 2012-145380, Japanese Laid-Open Patent Publication No. 2007-078459, Japanese Laid-Open Patent Publication No. 2002-513923 (PCT), Japanese Laid-Open Patent Publication No. 64-023107, and Japanese Laid-Open Patent Publication No. 2003-161641.

In Japanese Laid-Open Patent Publication No. 2013-164316, Japanese Laid-Open Patent Publication No. 2012-145380, and Japanese Laid-Open Patent Publication No. 2007-078459, there are disclosed multi-rotational-angle detection type position detecting devices in which a planetary gear is used in a speed reducing mechanism connected to a rotating shaft of a rotating body. In Japanese Laid-Open Patent Publication No. 2002-513923 (PCT) and Japanese Laid-Open Patent Publication No. 64-023107, there are disclosed position detecting devices in which a code recording medium is attached to a rotating shaft of a rotating body, together with attaching a multi-rotational angle detector attached to an output shaft of a speed reducing mechanism connected to the rotating shaft. In Japanese Laid-Open Patent Publication No. 2003-161641, there is disclosed a position detecting device in which data of a detected angle of rotation of a rotating shaft is converted into an absolute position, after having converted orthogonal coordinates into polar coordinates.

SUMMARY OF THE INVENTION

However, with the position detecting devices of Japanese Laid-Open Patent Publication No. 2013-164316, Japanese Laid-Open Patent Publication No. 2012-145380, and Japanese Laid-Open Patent Publication No. 2007-078459, magnets are attached to the shafts of a plurality of driven gears, and a plurality of sets of rotational angle detectors are attached at positions relative thereto. Therefore, in such position detecting devices, there is a disadvantage in that the size in the radial direction of the rotating shaft becomes greater.

Further, in the position detecting devices of Japanese Laid-Open Patent Publication No. 2002-513923 (PCT) and Japanese Laid-Open Patent Publication No. 64-023107, the code recording medium attached to the rotating shaft serves as an absolute position disc on which a specialized scannable code is deposited by vapor deposition or the like. Therefore, high accuracy is required, and such position detection devices tend to be high in cost.

Further, with the position detecting device of Japanese Laid-Open Patent Publication No. 2003-161641, in order to enable the absolute position to be output in real time, a high speed arithmetic processing unit is required.

The present invention has been devised with a view to solving the aforementioned problems, and has the object of providing a position detecting device, which is both small in size and low in cost, and is capable of carrying out arithmetic processing to calculate an absolute position using a low speed arithmetic processing device.

The present invention relates to a position detecting device in which a speed reducing mechanism is connected to a rotating shaft of a rotating body, and which is configured to detect an absolute position of the rotating shaft, on a basis of an angle of rotation of the rotating shaft and an angle of rotation of an output shaft of the speed reducing mechanism.

In addition, in order to accomplish the aforementioned object, the position detecting device according to the present invention includes first to third rotational angle detectors, an arithmetic processing unit, and a current position detecting unit.

The first rotational angle detector is configured to detect a first angle of rotation in a pitch interval of a gear attached substantially coaxially to the rotating shaft. The second rotational angle detector is configured to detect a second angle of rotation lying within one rotation of the rotating shaft. The third rotational angle detector is configured to detect a third angle of rotation lying within one rotation of the output shaft and corresponding to multiple rotations of the rotating shaft.

The arithmetic processing unit is configured to calculate an absolute position of the rotating shaft at a time of initiation of the position detecting device, on a basis of the first to third angles of rotation detected respectively by the first to third rotational angle detectors at the time of initiation. The current position detecting unit is configured to detect a current absolute position of the rotating shaft during rotation of the rotating shaft upon driving of the rotating body, on a basis of the first angle of rotation detected by the first rotational angle detector, and the absolute position of the rotating shaft at the time of initiation.

In accordance with the above configuration, the gear, the speed reducing mechanism, and the output shaft are disposed along the axial direction of the rotating shaft, and the first to third rotational angle detectors are arranged around the rotating shaft and the output shaft. Consequently, in the position detecting device, the size in the radial direction of the rotating shaft can be reduced.

Further, the first rotational angle detector detects the first angle of rotation in a pitch interval of the gear attached to the rotating shaft. Therefore, there is no need to provide a code recording medium on which a specialized code is carried, as disclosed in Japanese Laid-Open Patent Publication No. 2002-513923 (PCT) and Japanese Laid-Open Patent Publication No. 64-023107. Accordingly, the position detecting device can be produced at a reduced cost.

Furthermore, only at the time of initiation, and on the basis of the first to third angles of rotation, the arithmetic processing unit calculates the absolute position of the rotating shaft, which is in a stopped state at the time of initiation. As a result, during rotation of the rotating shaft, the current position detecting unit is capable of determining in a pseudo manner the current absolute position of the rotating shaft, from the first angle of rotation detected by the first rotational angle detector, taking as a standard the absolute position of the rotating shaft at the time of initiation.

More specifically, the position detecting device functions as an absolute type rotary encoder only at the time of initiation, and thereafter, functions as an incremental type rotary encoder. Stated otherwise, at the time of initiation, the absolute position of the rotating shaft in a stopped state is detected, and thereafter, during rotation of the rotating shaft, the first angle of rotation corresponding to the amount of movement of the rotating shaft with respect to the absolute position thereof at the time of initiation is detected. In addition, the position of the first angle of rotation with respect to the absolute position at the time of initiation may be determined as the current absolute position of the rotating shaft. As a result, calculating the absolute position in real time as in Japanese Laid-Open Patent Publication No. 2003-161641 is rendered unnecessary, and thus, it is possible to use a low speed and low cost arithmetic processing unit (CPU).

Further, in a conventional incremental rotary encoder, whenever the power supply is turned on and off, it is necessary to perform a magnetic pole detection operation and an origin point return operation. In contrast thereto, with the present invention, since the absolute position of the rotating shaft in the stopped state is detected at the time of initiation, the respective operations described above are unnecessary. As a result, if the position detecting device is installed in an electric actuator, it becomes possible to shorten the tact time.

In the foregoing manner, according to the present invention, it is possible to realize a smaller scale and a reduction in cost of the position detecting device, together with carrying out arithmetic processing to calculate an absolute position using a low speed arithmetic processing device.

In this instance, the first to third rotational angle detectors preferably are constituted in the manner described below.

Initially, the first rotational angle detector comprises a spur gear made up from a magnetic material and attached substantially coaxially with the rotating shaft, two first magnetic detecting elements disposed in facing relation to the spur gear, and with phases shifted mutually by 90°, in a case that an interval between tooth ends of the spur gear is defined as one cycle, and a first bias magnet. In this case, the first magnetic detecting elements are configured to output first analog signals, respectively, corresponding to the first angle of rotation, and whose phases are shifted mutually by 90°.

Accordingly, in the case that the magnetic field generated by the first bias magnet in a region including the respective first magnetic detecting elements undergoes a change due to rotation of the spur gear, each of the first magnetic detecting elements outputs the change in the magnetic field, respectively, as respective first analog signals. Since the respective first analog signals are signals that correspond to the first angle of rotation, the arithmetic processing unit is capable of highly accurately determining that the absolute position of the rotating shaft at the time of initiation corresponds to the position of a certain numbered tooth of the gear, based on the first analog signals, etc. Further, since a commercially available spur gear can be used, in comparison with the configurations of Japanese Laid-Open Patent Publication No. 2002-513923 (PCT) and Japanese Laid-Open Patent Publication No. 64-023107, a further reduction in cost of the position detecting device can be realized.

Next, the second rotational angle detector comprises a ring shaped second bias magnet attached substantially coaxially with the rotating shaft, and two second magnetic detecting elements disposed in facing relation to the second bias magnet, and with phases shifted mutually by 90°, in a case that one rotation of the rotating shaft is defined as one cycle. In this case, the second magnetic detecting elements are configured to output second analog signals, respectively, corresponding to the second angle of rotation, and whose phases are shifted mutually by 90°.

Accordingly, in the case that the magnetic field generated by the second bias magnet in a region including the respective second magnetic detecting elements undergoes a change, each of the second magnetic detecting elements outputs the change in the magnetic field, respectively, as respective second analog signals. Since the respective second analog signals are signals that correspond to the second angle of rotation, the arithmetic processing unit is capable of easily determining that the absolute position of the rotating shaft at the time of initiation corresponds to a certain angle within one rotation of the rotating shaft, based on the second analog signals, etc.

Further, the third rotational angle detector comprises a ring shaped third bias magnet attached substantially coaxially with the output shaft, and two third magnetic detecting elements disposed in facing relation to the third bias magnet, and with phases shifted mutually by 90°, in a case that one rotation of the output shaft is defined as one cycle. In accordance with this feature, the third magnetic detecting elements are configured to output third analog signals, respectively, corresponding to the third angle of rotation, and whose phases are shifted mutually by 90°.

Accordingly, in the case that the magnetic field generated by the third bias magnet in a region including the respective third magnetic detecting elements undergoes a change, each of the third magnetic detecting elements outputs the change in the magnetic field, respectively, as respective third analog signals. In this case, the speed reducing mechanism decelerates the rotational speed of the rotating body at a predetermined speed reduction ratio, and rotates the output shaft. Therefore, on the basis of the respective third analog signals, the arithmetic processing unit is capable of easily determining that the absolute position of the rotating shaft at the time of initiation corresponds to a certain angle within multiple rotations of the rotating shaft.

The position detecting device may further comprise an interpolator configured to convert the respective first analog signals output respectively by each of the first magnetic detecting elements into two-phase first pulse signals. In this case, the arithmetic processing unit is configured to calculate the absolute position of the rotating shaft at the time of initiation, based on each of the first to third analog signals output respectively by the first to third rotational angle detectors, and output a second pulse signal corresponding to the calculated absolute position.

Consequently, the current position detecting unit is capable of easily detecting the current absolute position of the rotating shaft on a basis of the first pulse signals output from the interpolator, and the second pulse signal output from the arithmetic processing unit. Further, regardless of the forward or reverse rotation of the rotating shaft, it is possible to ignore the influence of any backlash in the speed reducing mechanism.

In this case, the arithmetic processing unit may be configured to transmit the second pulse signal to the current position detecting unit as a serial signal including a number of pulses corresponding to the absolute position of the rotating shaft at the time of initiation. In accordance with this feature, a relatively low speed arithmetic processing unit can be used as the arithmetic processing unit, and by transmitting the serial signal to the current position detecting unit by way of serial communications, it is possible to further reduce the cost of the position detecting device.

The position detecting device may further include a multiplication circuit configured to generate a multiplied pulse signal obtained by multiplying each of the first pulse signals, and output the multiplied pulse signal to the current position detecting unit. In this case, the current position detecting unit may be a current position counter, which is configured to preset a number of pulses corresponding to the serial signal at the time of initiation, and during rotation of the rotating shaft, configured to count the number of pulses corresponding to the multiplied pulse signal from the preset number of pulses, thereby detecting the current absolute position of the rotating shaft.

In accordance with this feature, the current position counter, using the preset number of pulses as a reference, counts the number of pulses corresponding to the multiplied pulse signal, and therefore, is capable of easily and highly efficiently determining the current absolute position of the rotating shaft. Further, by supplying the multiplied pulse signal from the multiplication circuit to the current position counter, the resolution of the current absolute position of the rotating shaft in the current position counter is improved, and the absolute position can be obtained with high accuracy.

In this case, the multiplication circuit may be configured to determine a forward rotation or a reverse rotation of the rotating shaft by comparing the respective first pulse signals, and generate the multiplied pulse signal of the determined forward rotation or reverse rotation. Consequently, the current position counter is capable of accurately determining the current absolute position of the rotating shaft.

The position detecting device may further include a rotating body drive control unit configured to rotate the rotating shaft by driving the rotating body, in an event that the number of pulses corresponding to the serial signal is preset in the current position counter. Owing thereto, the rotating body can be operated after such presetting, and the absolute position of the rotating shaft during rotation of the rotating shaft can reliably be acquired.

Further, in the position detecting device according to the present invention, the above-mentioned configuration (also referred to as the basic configuration) can be exchanged with the following configurations.

That is, in order to accomplish the aforementioned object, the position detecting device according to the present invention, as another first configuration, includes a first rotational angle detector, a second rotational angle detector, an arithmetic processing unit, and a current position detecting unit.

The first rotational angle detector is configured to detect a first angle of rotation lying within one rotation of the rotating shaft. The second rotational angle detector is configured to detect a second angle of rotation lying within one rotation of the output shaft and corresponding to multiple rotations of the rotating shaft. The arithmetic processing unit is configured to calculate the absolute position of the rotating shaft at a time of initiation of the position detecting device, on a basis of the first angle of rotation and the second angle of rotation detected respectively by the first rotational angle detector and the second rotational angle detector at the time of initiation. The current position detecting unit is configured to detect a current absolute position of the rotating shaft during rotation of the rotating shaft upon driving of the rotating body, on a basis of the first angle of rotation detected by the first rotational angle detector, and the absolute position of the rotating shaft at the time of initiation.

In this case, the first rotational angle detector comprises a cylindrical bias magnet which is substantially coaxially attached to the rotating shaft, and a magnetic detecting element which is arranged in facing relation to the bias magnet. The magnetic detecting element is configured to output to the arithmetic processing unit a serial signal corresponding to the first angle of rotation, and further output to the current position detecting unit two-phase pulse signals which correspond to the first angle of rotation and whose phases are shifted mutually by 90°.

In this first configuration, the magnetic detecting element has both functions of outputting the serial signal to the arithmetic processing unit and of outputting the two-phase pulse signals to the current position detecting unit as interpolation processing. Further, the arithmetic processing unit calculates the absolute position of the rotating shaft at the time of initiation, on the basis of the serial signal, and the second angle of rotation detected by the second rotational angle detector. Therefore, according to the first configuration, the position detecting device can be produced at a reduced cost since the number of parts of the position detecting device is reduced, and computation load in the arithmetic processing unit is reduced. Further, since the cylindrical bias magnet is adopted, the detection accuracy of the first angle of rotation can be improved.

In the first configuration as well, the following advantageous effects can be achieved, in a manner similar to the case of the position detecting device having the basic configuration described above.

That is, the speed reducing mechanism and the output shaft are disposed along the axial direction of the rotating shaft, and the first rotational angle detector and the second rotational angle detector are arranged around the rotating shaft and the output shaft. Consequently, the size in the radial direction of the rotating shaft can be reduced.

Further, only at the time of initiation, and on the basis of the first angle of rotation and the second angle of rotation, the arithmetic processing unit calculates the absolute position of the rotating shaft, which is in a stopped state at the time of initiation. As a result, during rotation of the rotating shaft, the current position detecting unit is capable of determining in a pseudo manner and easily the current absolute position of the rotating shaft, from the two-phase pulse signals, taking as a standard the absolute position of the rotating shaft at the time of initiation. Furthermore, regardless of the forward or reverse rotation of the rotating shaft, it is possible to ignore the influence of any backlash in the speed reducing mechanism.

More specifically, the position detecting device functions as an absolute type rotary encoder only at the time of initiation, and thereafter, functions as an incremental type rotary encoder. As a result, calculating the absolute position in real time is rendered unnecessary, and thus, it is possible to use a low speed and low cost CPU. If such a position detecting device is installed in an electric actuator or the like, it becomes possible to shorten the tact time.

Consequently, according to the first configuration, it is possible to realize a smaller scale and a reduction in cost of the position detecting device, together with carrying out arithmetic processing to calculate an absolute position using a low speed arithmetic processing device.

The position detecting device may include a rotation transmission mechanism configured to transmit a rotational force of the rotating shaft to an input shaft of the speed reducing mechanism, and the rotating shaft, the input shaft, and the output shaft may be arranged substantially coaxially. Though the position detecting device becomes slightly large in the radial direction due to the rotation transmission mechanism, the number of parts of the position detecting device is reduced because the first rotational angle detector having the interpolation function is used. Thus, it is possible to realize a reduction in cost of the entire device. As the rotation transmission mechanism, various types of rotation transmission mechanisms such as another speed reducing mechanism having the speed reducing ratio of 1 or rotation transmission means using belts can be preferably adopted.

That is, in order to accomplish the aforementioned object, the position detecting device according to the present invention, as another second configuration, includes first to third rotational angle detectors, a first speed reducing mechanism, a second speed reducing mechanism, an arithmetic processing unit, and a current position detecting unit.

The first rotational angle detector is configured to detect a first angle of rotation lying within one rotation of the rotating shaft. The first speed reducing mechanism is configured to decelerate and output a rotational speed of the rotating shaft. The second speed reducing mechanism includes an input shaft connected to the first speed reducing mechanism, and is configured to further decelerate the rotational speed of the rotating shaft which has been decelerated by the first speed reducing mechanism and to output the further decelerated rotational speed to the output shaft. The second rotational angle detector is configured to detect a second angle of rotation lying within one rotation of the input shaft and corresponding to multiple rotations of the rotating shaft. The third rotational angle detector is configured to detect a third angle of rotation lying within one rotation of the output shaft and corresponding to the multiple rotations of the rotating shaft.

The arithmetic processing unit is configured to calculate an absolute position of the rotating shaft at a time of initiation of the position detecting device, on a basis of the first to third angles of rotation detected respectively by the first to third rotational angle detectors at the time of initiation. The current position detecting unit is configured to detect a current absolute position of the rotating shaft during rotation of the rotating shaft upon driving of the rotating body, on a basis of the first angle of rotation detected by the first rotational angle detector, and the absolute position of the rotating shaft at the time of initiation.

In this case, the first rotational angle detector includes a cylindrical bias magnet which is substantially coaxially attached to the rotating shaft, and a magnetic detecting element which is arranged in facing relation to the bias magnet. The magnetic detecting element is configured to output to the arithmetic processing unit a serial signal corresponding to the first angle of rotation, and further output to the current position detecting unit two-phase pulse signals which correspond to the first angle of rotation and whose phases are shifted mutually by 90°.

In this second configuration, compared with the above-mentioned position detecting device equipped with the first and second rotational angle detectors, the position detecting device is equipped with three rotational angle detectors (first to third rotational angle detectors), and two speed reducing mechanisms (first speed reducing mechanism and second speed reducing mechanism). Thus, compared with the first configuration, the number of parts is large, and computation load in the arithmetic processing unit is large, resulting in high cost.

However, the second rotational angle detector and the third rotational angle detector respectively detects the second angle of rotation and the third angle of rotation corresponding to multiple rotations of the rotating shaft, and the arithmetic processing unit is capable of calculating the absolute position of the rotating shaft at the time of initiation with high precision, using the detected second and third angles of rotation, etc. As a result, compared with conventional position detecting devices, the absolute position can be calculated with high precision and the cost can be reduced. Further, since the cylindrical bias magnet is adopted, the detection accuracy of the first angle of rotation can be improved.

In the second configuration as well, because of the first to third rotational angle detectors, the advantageous effects can be achieved in a manner similar to the position detecting device having the basic configuration described above.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a position detecting device according to the present invention will be described in detail below with reference to the accompanying drawings.

Configuration of the Present Embodiment

Figure 1:
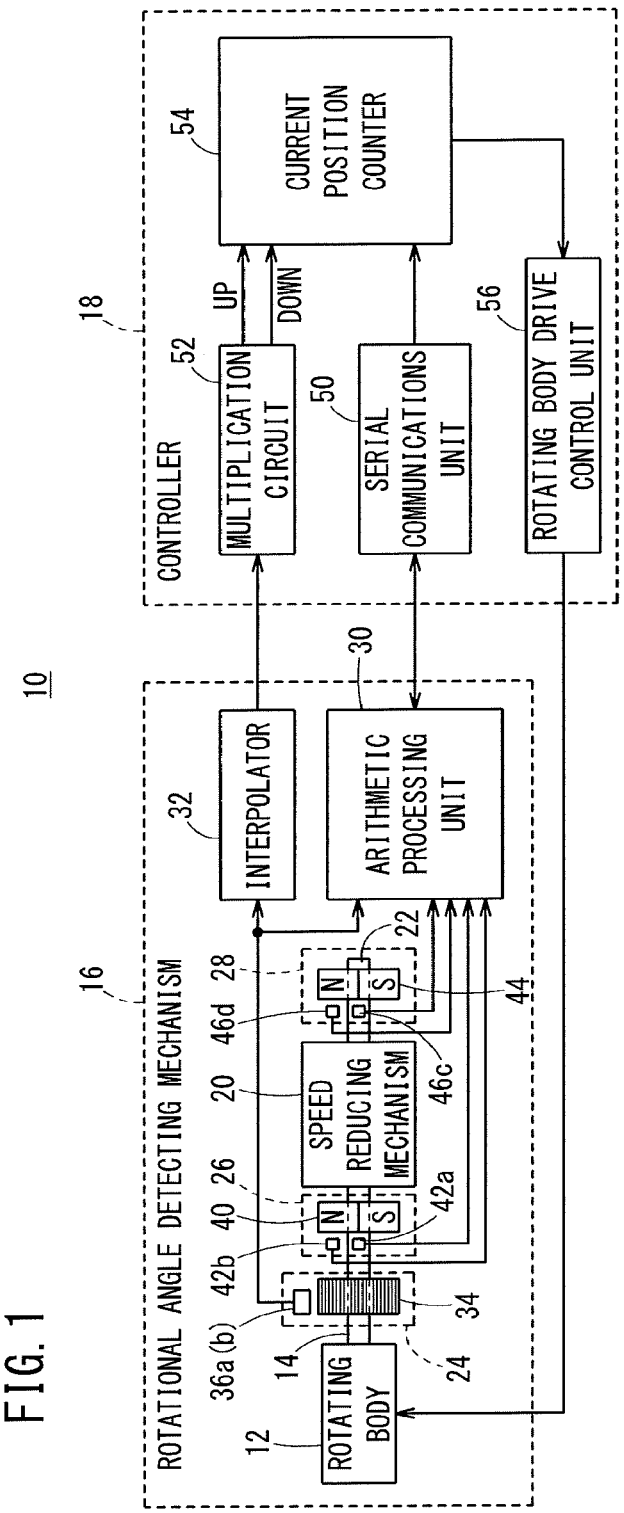
FIG. 1 is a block diagram of a position detecting device according to a present embodiment.

FIG. 1 is a block diagram of a position detecting device 10 according to a present embodiment.

The position detecting device 10 includes a rotational angle detecting mechanism 16 that detects an angle of rotation of a rotating shaft 14 of a rotating body 12 such as a motor or the like, and a controller 18 that controls driving of the rotating body 12.

A speed reducing mechanism 20 is connected to the rotating shaft 14. The speed reducing mechanism 20 decelerates the rotational speed of the rotating shaft 14 by 1/N, and causes an output shaft 22 to rotate at such a decelerated speed. N is a speed reduction ratio of the speed reducing mechanism 20.

The rotational angle detecting mechanism 16 comprises first to third rotational angle detectors 24 to 28, an arithmetic processing unit 30, and an interpolator 32.

Figure 2:
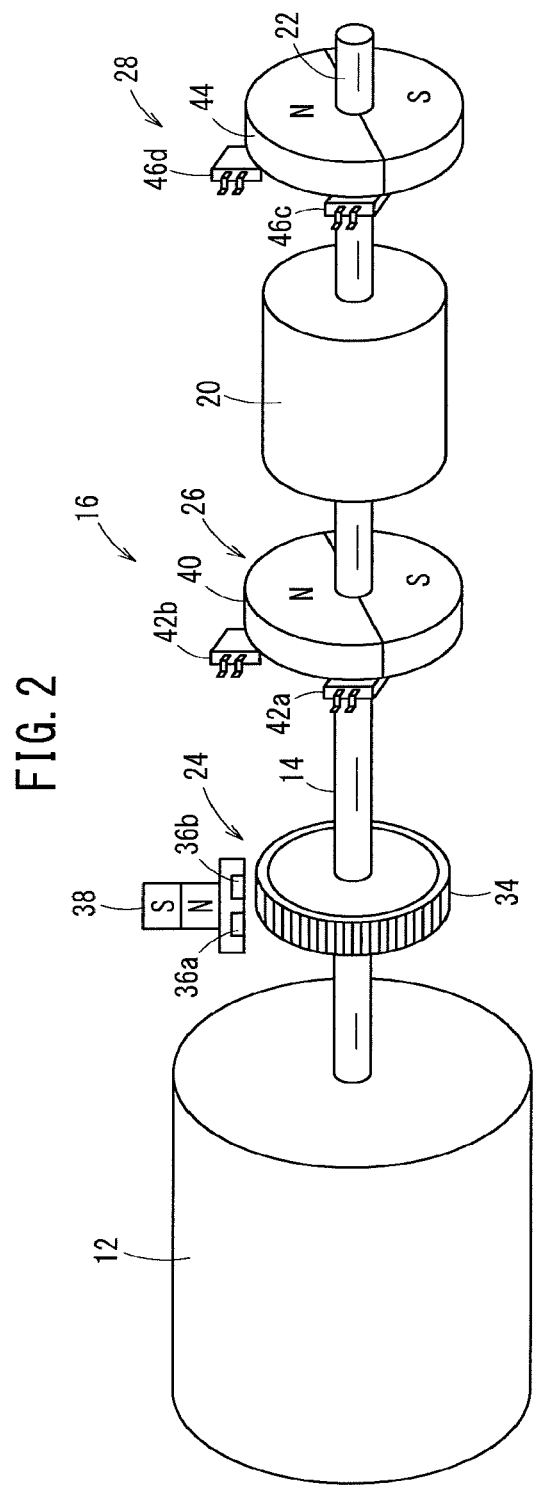
FIG. 2 is a schematic configuration diagram of a rotational angle detecting mechanism of FIG. 1.
Figure 3:
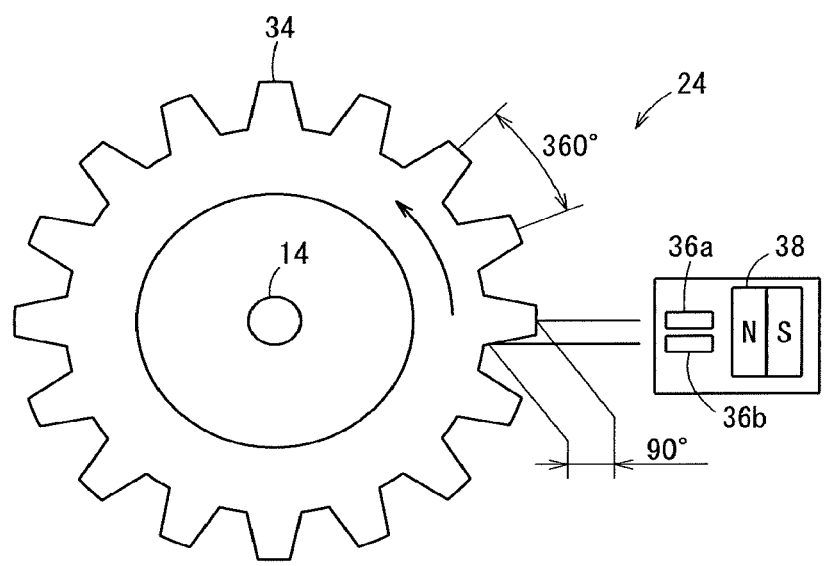
FIG. 3 is an explanatory diagram of a first rotational angle detector of FIGS. 1 and 2.

As shown in FIGS. 1 to 3, the first rotational angle detector 24 is an angle detector for a spur gear, made up from a spur gear 34 which is attached substantially coaxially with the rotating shaft 14, two first magnetic detecting elements 36a, 36b disposed in facing relation to the spur gear 34, and a first bias magnet 38 disposed behind the first magnetic detecting elements 36a, 36b (on an outer side in the radial direction of the spur gear 34).

For the spur gear 34, a commercially available spur gear can be used which is capable of being attached to the rotating shaft 14. In the case that an interval (pitch interval) between tooth ends of the spur gear 34 is defined as one cycle (360°), the two first magnetic detecting elements 36a, 36b are arranged in facing relation to the spur gear 34 in a state with the phases thereof being shifted mutually by 90° in the circumferential direction of the spur gear 34. The first bias magnet 38 is arranged in a state with the N-pole thereof on a radial inner side and the S-pole thereof on a radial outer side of the spur gear 34, on the rear side of the respective first magnetic detecting elements 36a, 36b.

In addition, with the first rotational angle detector 24, when a magnetic field is generated by the first bias magnet 38 in a region including the respective first magnetic detecting elements 36a, 36b, the magnetic field undergoes a change when the spur gear 34 which is a magnetic body rotates accompanying a rotating operation of the rotating shaft 14. Each of the first magnetic detecting elements 36a, 36b detects the change in the magnetic field as a voltage change, and outputs the detected voltage as a first analog signal.

Figure 4A:
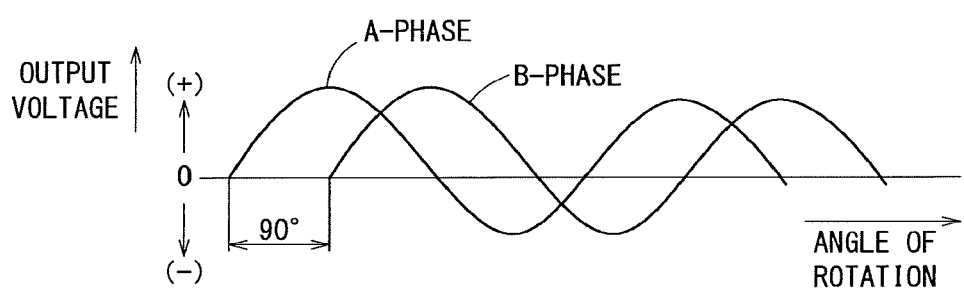
FIG. 4A is a waveform diagram of output voltage waveforms output from a first magnetic detecting element.

FIG. 4A is a waveform diagram of first analog signals (output voltage waveforms) output from the first magnetic detecting elements 36a, 36b. In FIG. 4A, the A-phase indicates a first analog signal (sine wave signal) output from one first magnetic detecting element 36a, and the B-phase indicates a first analog signal (cosine wave signal) output from the other first magnetic detecting element 36b. Further, it should be noted that, in FIG. 4A, the horizontal axis shows the angle of rotation of the spur gear 34 as time elapses.

As noted previously, since the two first magnetic detecting elements 36a, 36b are arranged in a state of being shifted 90° in phase, a phase difference of 90° occurs between the A-phase and the B-phase. Further, in the A-phase and the B-phase, the angle of rotation of 360° corresponds to one cycle between the tooth ends of the spur gear 34. In other words, the one cycle corresponds to an electrical angle of 360°. Consequently, in the case that the interval between tooth ends of the spur gear 34 is defined as one cycle, the first rotational angle detector 24 detects an arbitrary position (first angle of rotation) of the spur gear 34 within one cycle, and outputs the arbitrary position as a first analog signal to the arithmetic processing unit 30 and the interpolator 32.

Figure 4B:
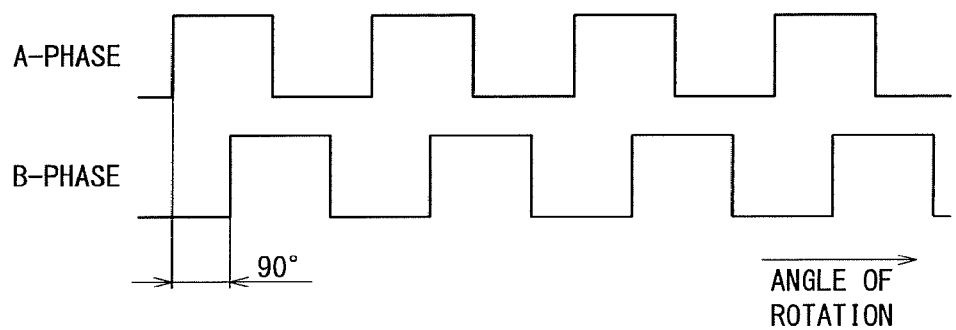
FIG. 4B is a waveform diagram of two-phase first pulse signals which were converted by an interpolator from the output voltage waveforms.

The interpolator 32 is an analog voltage comparison type of phase interpolation circuit in which a resistor network is used. Concerning the respective first analog signals shown in FIG. 4A, by performing interpolation over a predetermined number of divisions S, the first analog signals are converted into two-phase first pulse signals shown in FIG. 4B with a phase difference of 90°, which are output to the controller 18. In comparison with the transmission of second pulse signals, which will be described later, from the arithmetic processing unit 30 to the controller 18 by way of serial communications, transmission of the two-phase first pulse signals from the interpolator 32 to the controller 18 takes place at a higher transmission speed.

As shown in FIGS. 1 and 2, the second rotational angle detector 26 is a one-rotation rotational angle detector, made up from a ring shaped second bias magnet 40 attached substantially coaxially with the rotating shaft 14, and two second magnetic detecting elements 42a, 42b arranged in facing relation to the second bias magnet 40.

The second bias magnet 40 is mounted on the rotating shaft 14 at a location between the spur gear 34 and the speed reducing mechanism 20. In this case, within the ring shaped second bias magnet 40, one semicircular portion thereof is allocated to the N-pole, whereas the other semicircular portion thereof is allocated to the S-pole. The two second magnetic detecting elements 42a, 42b are Hall elements which, in the case that one rotation of the rotating shaft 14 and the second bias magnet 40 is defined as one cycle (360°), are arranged in facing relation to the second bias magnet 40 in a state with the phases thereof being shifted mutually by 90° in the circumferential direction of the rotating shaft 14 and the second bias magnet 40.

In addition, with the second rotational angle detector 26, when a magnetic field is generated by the second bias magnet 40 in a region including the respective second magnetic detecting elements 42a, 42b, the magnetic field undergoes a change when the second bias magnet 40 rotates accompanying a rotating operation of the rotating shaft 14. Each of the second magnetic detecting elements 42a, 42b detects the change in the magnetic field as a voltage change, and outputs the detected voltage as a second analog signal.

Figure 5A:
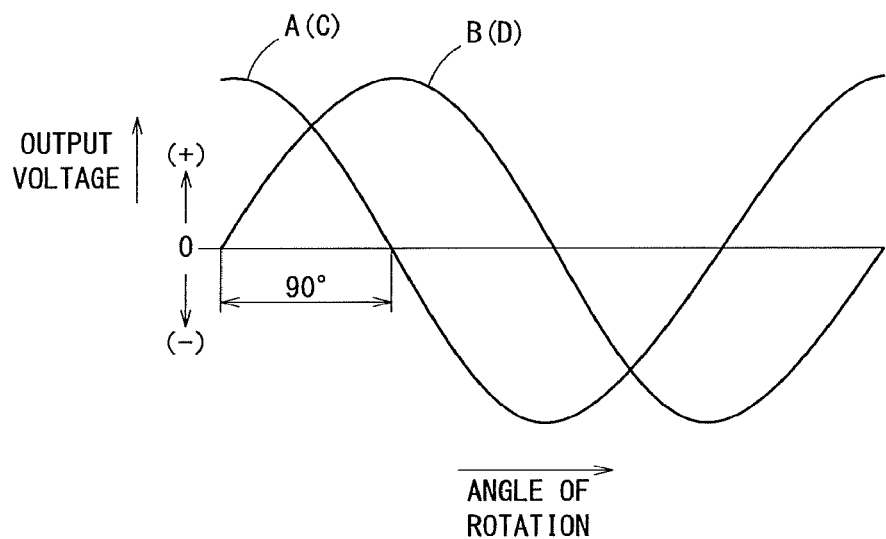
FIG. 5A is a waveform diagram of output voltage waveforms output from second and third magnetic detecting elements.

FIG. 5A is a waveform diagram of second analog signals output from second magnetic detecting elements 42a, 42b. In FIG. 5A, the letter "A" indicates a second analog signal (cosine wave signal) output from one second magnetic detecting element 42a, and the letter "B" indicates a second analog signal (sine wave signal) output from the other second magnetic detecting element 42b. Further, in FIG. 5A, the horizontal axis represents the angle of rotation of the rotating shaft 14 and the second bias magnet 40 as time elapses.

Figure 5B:
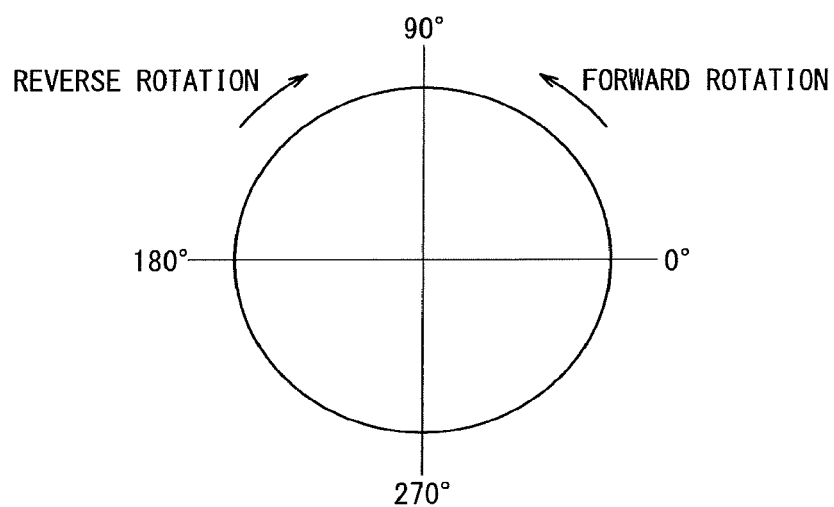
FIG. 5B is a diagram showing a change in phase lying within one rotation.

FIG. 5B shows a change in the angle of rotation lying within one rotation of the rotating shaft 14 and the second bias magnet 40. In this instance, rotation in a counterclockwise direction with respect to 0° (in a case where the B-phase lags with respect to the A-phase) is defined as a forward rotation, whereas rotation in a clockwise direction (in a case where the A-phase lags with respect to the B phase) is defined as a reverse rotation.

As noted previously, since the two second magnetic detecting elements 42a, 42b are arranged in a state of being shifted 90° in phase, a phase difference of 90° occurs between the A and B waveforms. Further, in the A and B waveforms, 360° corresponds to one cycle of the rotating shaft 14 and the second bias magnet 40. In other words, the one cycle corresponds to an electrical angle of 360°. Consequently, in the case that one rotation of the rotating shaft 14 and the second bias magnet 40 is defined as one cycle, the second rotational angle detector 26 detects an arbitrary position (second angle of rotation) of the rotating shaft 14 and the second bias magnet 40 within one cycle, and outputs the arbitrary position as a second analog signal to the arithmetic processing unit 30.

As shown in FIGS. 1 and 2, the third rotational angle detector 28 is a multi-rotation rotational angle detector, made up from a ring shaped third bias magnet 44 attached substantially coaxially with the output shaft 22, and two third magnetic detecting elements 46c, 46d arranged in facing relation to the third bias magnet 44. Within the ring shaped third bias magnet 44, one semicircular portion thereof is allocated to the N-pole, whereas the other semicircular portion thereof is allocated to the S-pole. The two third magnetic detecting elements 46c, 46d are Hall elements which, in the case that one rotation of the output shaft 22 is defined as one cycle (360°), are arranged in facing relation to the third bias magnet 44 in a state with the phases thereof being shifted mutually by 90° in the circumferential direction of the output shaft 22 and the third bias magnet 44.

In addition, with the third rotational angle detector 28, when a magnetic field is generated by the third bias magnet 44 in a region including the respective third magnetic detecting elements 46c, 46d, the magnetic field undergoes a change when the third bias magnet 44 rotates accompanying a rotating operation of the output shaft 22. Each of the third magnetic detecting elements 46c, 46d detects the change in the magnetic field as a voltage change, and outputs the detected voltage as a third analog signal.

Accordingly, as shown in FIG. 5A, the waveforms of the third analog signals output from the third magnetic detecting elements 46c, 46d are waveforms having similar characteristics as those of the second analog signals. Moreover, in FIG. 5A, the letter "C" indicates a third analog signal (cosine wave signal) output from one third magnetic detecting element 46c, and the letter "D" indicates a third analog signal (sine wave signal) output from the other third magnetic detecting element 46d. Further, since the two third magnetic detecting elements 46c, 46d are arranged in a state of being shifted 90° in phase, a phase difference of 90° occurs between the C and D waveforms. Furthermore, in the C and D waveforms, an electrical angle of 360° corresponds to one cycle of the output shaft 22 and the third bias magnet 44.

However, the speed reducing mechanism 20 decelerates the rotational speed of the rotating shaft 14 by 1/N, and causes the output shaft 22 to be rotated at such a decelerated speed. Consequently, in the case that one rotation of the output shaft 22 and the third bias magnet 44 is defined as one cycle, the third rotational angle detector 28 detects an arbitrary position (third angle of rotation) of the output shaft 22 and the third bias magnet 44 corresponding to multiple rotations of the rotating shaft 14, and outputs the arbitrary position as a third analog signal to the arithmetic processing unit 30. Therefore, the maximum amount of rotation of the rotating shaft 14 corresponds to an amount within one rotation of the output shaft 22.

The arithmetic processing unit 30 is constituted by a comparatively low speed and small scale arithmetic processing device (CPU). The arithmetic processing unit 30 calculates the absolute position of the rotating shaft 14 in a stopped state at a time of initiation, on the basis of the first to third analog signals from the first to third rotational angle detectors 24 to 28, at the time of initiation of the position detecting device 10. In addition, in the case that a request is made from the controller 18 to transfer the absolute position, the arithmetic processing unit 30 transfers to the controller 18 by way of serial communications a serial signal corresponding to the absolute position.

Processing that takes place in the arithmetic processing unit 30 will now be described in detail. Initially, the arithmetic processing unit 30 converts the output voltages of the first to third analog signals from rectangular coordinates into polar coordinates.

In this case, concerning the first analog signal, a distance between the tooth ends of the spur gear 34 defines one cycle (360°), and the one cycle is divided into S individual segments. Further, concerning the second analog signal, one rotation of the rotating shaft 14 and the second bias magnet 40 defines one cycle (360°), and the one cycle is divided into T individual segments. Concerning the third analog signal, one rotation of the output shaft 22 defines one cycle (360°), and the one cycle is divided into N individual segments. Furthermore, the maximum amount of rotation of the rotating shaft 14 is made to correspond to an amount within one rotation of the output shaft 22. Moreover, concerning the conversion process (division process) from rectangular coordinates to polar coordinates, a known type of interpolation method may be applied, as disclosed for example in Japanese Laid-Open Patent Publication No. 2002-513923 (PCT).

In this instance, if the position of the spur gear 34 is designated by P1 (first angle of rotation), the division number at the spur gear 34 is designated by S, the position of the second bias magnet 40 is designated by P2 (second angle of rotation), the division number at the second bias magnet 40 is designated by T, the position of the third bias magnet 44 is designated by P3 (third angle of rotation), and the division number at the third bias magnet 44 is designated by N, then the amount of rotation TA of the rotating shaft 14 can be expressed by the following equation (1).

$$TA=(P1\div T)+\text{INT}(P2\times T\div 360)\times(360\div T)+(P3\times N) \tag{1}$$

The term INT(P2×T÷360) implies rounding off of the decimal places of the calculation result of P2×T÷360 to place it in the form of an integer. Further, the division number T is the number of teeth T of the spur gear 34, and the division number N is the speed reduction ratio N.

In addition, in the case that the absolute position is transferred by way of serial communications from the arithmetic processing unit 30 to the controller 18, assuming that the number of pulses when the rotating shaft 14 is rotated one time is represented by PP, then the number of pulses (total number of pulses) TP corresponding to the amount of rotation TA is given by the following equation (2).

$$TP=TA\div(360\div PP) \tag{2}$$

Accordingly, when the calculation result of the total number of pulses TP is rounded to an integer by truncating the decimal portion, the following equation (3) is obtained.

$$TP=\text{INT}(TA\times PP\div 360) \tag{3}$$

Using equations (1) and (3), the arithmetic processing unit 30 calculates the total number of pulses TP corresponding to the absolute position of the rotating shaft 14 in a stopped state at the time of initiation, and following calculation thereof, transfers to the controller 18 a serial signal (second pulse signal) corresponding to the calculated total number of pulses TP.

In this instance, for example, in the case that T=25, N=150, P1=55°, P2=175°, P3=156°, PP=200, and S=8, then TA=23575° and TP=13097.

The controller 18 includes a serial communications unit 50, a multiplication circuit 52, a current position counter (current position detecting unit) 54, and a rotating body drive control unit 56.

The serial communications unit 50 carries out serial communications with the arithmetic processing unit 30. For example, a transfer request for the total number of pulses TP is transmitted with respect to the arithmetic processing unit 30, and a serial signal responsive to the transfer request (a second pulse signal of the total number of pulses TP) is received.

The multiplication circuit 52 multiplies the first pulse signals received from the interpolator 32, and following multiplication thereof, outputs the first pulse signals (multiplied pulse signal) to the current position counter 54. In this case, as shown in FIGS. 6 and 7, for example, by examining the voltage level of the B-phase at a time when the A-phase is rising, the multiplication circuit 52 distinguishes between forward rotation or reverse rotation of (the rotating shaft 14 corresponding to) the two-phase first pulse signals, and generates a multiplied pulse signal of the forward rotation or reverse rotation thus determined.

Figure 6:
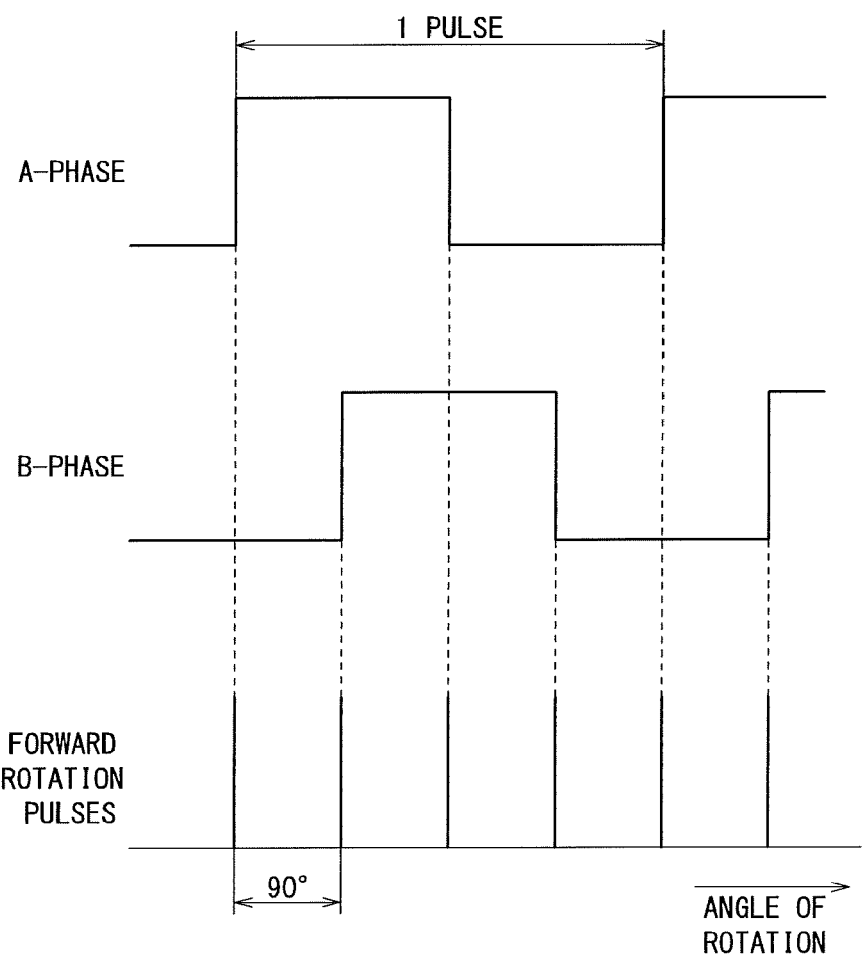
FIG. 6 is a waveform diagram of first pulse signals and forward rotation pulses.

In the case of FIG. 6, since the voltage level of the B-phase is of a low level (L level) at times when the A-phase is rising, the multiplication circuit 52 distinguishes the two-phase first pulse signals as being indicative of forward rotation, and generates a multiplied pulse signal (forward rotation pulse signal) multiplied four times with forward rotation. In the case of FIG. 7, since the voltage level of the B-phase is of a high level (H level) at times when the A-phase is rising, the multiplication circuit 52 distinguishes the two-phase first pulse signals as being indicative of reverse rotation, and generates a multiplied pulse signal (reverse rotation pulse signal) multiplied four times with reverse rotation.

Figure 7:
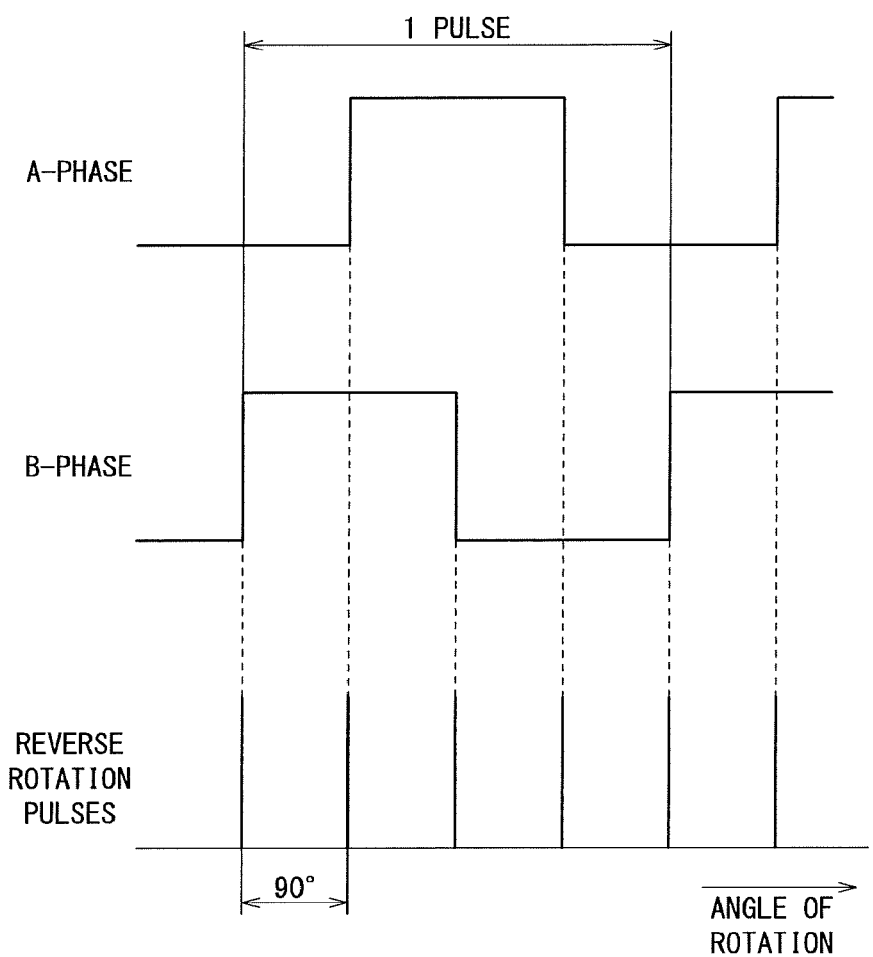
FIG. 7 is a waveform diagram of first pulse signals and reverse rotation pulses.

FIGS. 6 and 7 illustrate one example in which the multiplication circuit 52 is capable of generating from the two-phase first pulse signals a multiplied pulse signal multiplied one time (×1), two times (×2), or four times (×4). Further, the multiplication circuit 52 is capable of changing from a multiplied pulse signal having a high scaling factor to a multiplied pulse signal having a low scaling factor (multiplied four times multiplied two times multiplied one time).

At the time of initiation of the position detecting device 10, the current position counter 54 presets the number of total pulses TP acquired by the serial communications unit 50. Further, during rotation of the rotating shaft 14, the multiplied pulse signal from the multiplication circuit 52 is input to the current position counter 54. Thus, the current position counter 54, using the preset total number of pulses TP as a reference, counts the number of pulses corresponding to the multiplied pulse signal, whereby the current absolute position of the rotating shaft 14 is detected in a pseudo manner.

In the event that the total number of pulses TP is preset in the current position counter 54, and by supplying a rotating body operation signal to the rotating body 12, the rotating body drive control unit 56 drives the rotating body 12 and causes the rotating shaft 14 to rotate.

Operations of the Present Embodiment

Next, operations of the position detecting device 10 according to the present embodiment will be described with reference to the sequence diagrams shown in FIGS. 8 and 9. In the description of such operations, as necessary, explanations may also be made while referring to FIGS. 1 through 7.

First, in step S1, the operator turns on the power supply of the controller 18 of the position detecting device 10. Consequently, in step S2, the controller 18 starts supplying power with respect to the rotational angle detecting mechanism 16. As a result, in step S3, the rotational angle detecting mechanism 16 receives the supply of power from the controller 18 and is started. In this case, the rotational angle detecting mechanism 16 activates only the first to third rotational angle detectors 24 to 28 and the arithmetic processing unit 30.

In the following step S4, the first to third rotational angle detectors 24 to 28 detect the first to third angles of rotation at the current time (at the time of initiation of the position detecting device 10), and output to the arithmetic processing unit 30 first to third analog signals corresponding to the first to third angles of rotation.

Next, in step S5, the arithmetic processing unit 30 calculates the total number of pulses TP corresponding to the absolute position of the rotating shaft 14, which is in a stopped state at the time of initiation of the position detecting device 10, from the above-described equations (1) and (3), and based on the input first to third analog signals. In step S6, the arithmetic processing unit 30 converts the total number of pulses TP into a serial signal (second pulse signal).

In the following step S7, the arithmetic processing unit 30 confirms whether or not a transfer request for the serial signal has been issued from the controller 18. If there is no such transfer request, the routine returns to step S4, and the processes of steps S4 to S7 are executed again. Accordingly, until a notification of the transfer request from the controller 18 is received, the rotational angle detecting mechanism 16 sequentially executes the detection process for the absolute position of the rotating shaft 14 in the stopped state.

On the other hand, in step S8, if the serial communications unit 50 of the controller 18 carries out a transfer request for the serial signal with respect to the arithmetic processing unit 30, then the arithmetic processing unit 30 receives the notification of the transfer request (step S7: YES), and initiates transmission of the serial signal to the serial communications unit 50 (step S9). The arithmetic processing unit 30 continues the transmission process of the serial signal until a notification of completion of reception of the serial signal is received from the serial communications unit 50 (step S9, step S10: NO).

When reception of the serial signal is initiated, in step S11, the serial communications unit 50 carries out a judgment process as to whether or not reception of the serial signal has ended. If reception of the serial signal is not yet completed (step S11: NO), step S8 is executed again, and the transfer request for the serial signal is carried out with respect to the arithmetic processing unit 30.

On the other hand, if reception of the serial signal has ended (step S11: YES), the serial communications unit 50 outputs the serial signal to the current position counter 54, and in step S12, the current position counter 54 presets the total number of pulses TP corresponding to the input serial signal.

In step S13, the serial communications unit 50, upon confirming that the total number of pulses TP has been preset, transmits a notification of completion of reception to the arithmetic processing unit 30. When the notification of completion of reception is received, the arithmetic processing unit 30 determines that transmission of the serial signal has ended (step S10: YES), and transitions into an operating mode for driving rotation of the rotating body 12 (step S14 of FIG. 9). In the operating mode, the rotational angle detecting mechanism 16 operates only the first rotational angle detector 24 and the interpolator 32.

In step S15, upon confirming that the total number of pulses TP has been preset, the rotating body drive control unit 56 supplies to the rotating body 12 a rotating body operating signal for driving rotation of the rotating body 12. The rotating body 12 is driven based on the supply of the rotating body operating signal, whereupon the rotating shaft 14 is rotated (step S16).

In step S17, the first magnetic detecting elements 36a, 36b of the first rotational angle detector 24 output first analog signals, respectively, to the interpolator 32, corresponding to the first angle of rotation of the rotating shaft 14 during rotation thereof. The first angle of rotation is an angle of rotation indicative of an amount of movement (amount of rotation) of the rotating shaft 14 with respect to the absolute position of the rotating shaft 14 in the stopped state, and the respective first analog signals are analog signals corresponding to such an amount of movement. The interpolator 32 converts the respective first analog signals into the two-phase first pulse signals, and outputs each of the converted first pulse signals to the multiplication circuit 52 of the controller 18.

Next, in step S18, the rotational angle detecting mechanism 16 determines whether or not the supply of power from the controller 18 has been stopped. If the supply of power is not stopped (step S18: NO), the processes of steps S16 to S18 are executed again. More specifically, until the supply of power from the controller 18 is stopped (step S18: YES), the rotational angle detecting mechanism 16 repeatedly executes the detection operation of the first angle of rotation, and the output operation of the two-phase first pulse signals.

On the other hand, in step S19, if the respective first pulse signals have been input to the multiplication circuit 52, the multiplication circuit 52 compares the two-phase first pulse signals, and determines whether the two-phase first pulse signals are indicative of forward rotation or reverse rotation. On the basis of such a determination result, the multiplication circuit 52 generates either a forward rotation multiplied pulse signal (forward rotation pulses) or a reverse rotation multiplied pulse signal (reverse rotation pulses) in which the first pulse signals are multiplied, and the generated forward rotation pulses or reverse rotation pulses are output to the current position counter 54.

The current position counter 54, using the preset total number of pulses TP as a reference, counts the number of pulses of the forward rotation pulses or the reverse rotation pulses from the total number of pulses TP. More specifically, the current position counter 54 detects in a pseudo manner the current absolute position corresponding to the angle of rotation (amount of movement, amount of rotation) of the rotating shaft 14 during rotation thereof, taking as an origin point the absolute position of the rotating shaft 14 in a stopped state at the time of initiation, which corresponds to the total number of pulses TP.

Next, in step S20, the controller 18 confirms whether or not the power supply of the controller 18 should be turned off. If the power supply is not to be turned OFF (step S20: NO), the controller 18 executes the processes of steps S15, S19, and S20 again. More specifically, in the position detecting device 10, the process of detecting the absolute position of the rotating shaft 14 is executed sequentially until the power supply of the controller 18 is turned off.

In step S20, if the operator turns off the power supply of the controller 18 (step S20: YES), the respective components inside the controller 18 are stopped (step S21), together with stopping the supply of power to the rotational angle detecting mechanism 16 (step S18: YES). As a result, the respective components inside the rotational angle detecting mechanism 16 also are stopped (step S22).

Effects of the Present Embodiment

As has been described above, in accordance with the position detecting device 10 according to the present embodiment, the spur gear 34, the speed reducing mechanism 20, and the output shaft 22 are disposed along the axial direction of the rotating shaft 14, and by arranging the first to third rotational angle detectors 24 to 28 around the rotating shaft 14 and the output shaft 22, the size in the radial direction of the rotating shaft 14 in the position detecting device 10 can be reduced.

Further, the first rotational angle detector 24 detects the first angle of rotation in a pitch interval of the spur gear 34 attached to the rotating shaft 14. Therefore, there is no need to provide a code recording medium on which a specialized code is carried, as disclosed in Japanese Laid-Open Patent Publication No. 2002-513923 (PCT) and Japanese Laid-Open Patent Publication No. 64-023107. Accordingly, the position detecting device 10 can be produced at a reduced cost.

Furthermore, the arithmetic processing unit 30 calculates the absolute position of the rotating shaft 14 in a stopped state at a time of initiation, on the basis of the first to third angles of rotation, only at the time of initiation of the position detecting device 10. As a result, during rotation of the rotating shaft 14, the current position counter 54 is capable of determining in a pseudo manner the current absolute position of the rotating shaft 14, from the first angle of rotation detected by the first rotational angle detector 24, taking as a standard the absolute position of the rotating shaft 14 in the stopped state at the time of initiation.

More specifically, the position detecting device 10 functions as an absolute type rotary encoder only at the time of initiation, and thereafter, functions as an incremental type rotary encoder. Stated otherwise, with the position detecting device 10, at the time of initiation, the absolute position of the rotating shaft 14 in a stopped state is detected, and thereafter, during rotation of the rotating shaft 14, the first angle of rotation corresponding to the amount of movement (rotation amount) of the rotating shaft 14 with respect to the absolute position thereof at the time of initiation is detected. In addition, the position of the first angle of rotation with respect to the absolute position at the time of initiation is determined as the current absolute position of the rotating shaft 14. As a result, calculating the absolute position in real time as in Japanese Laid-Open Patent Publication No. 2003-161641 is rendered unnecessary, and thus, it is possible to use a low speed and low cost arithmetic processing unit (CPU) as the arithmetic processing unit 30.

Further, in a conventional incremental rotary encoder, whenever the power supply is turned on and off, it is necessary to perform a magnetic pole detection operation and an origin point return operation. In contrast thereto, with the position detecting device 10, since the absolute position of the rotating shaft 14 at the time of initiation can be detected, the aforementioned operations are unnecessary. As a result, if the position detecting device 10 is installed in an electric actuator or the like, it becomes possible to shorten the tact time.

In the foregoing manner, in accordance with the position detecting device 10 according to the present embodiment, it is possible to realize a smaller scale and a reduction in cost of the position detecting device 10, together with carrying out arithmetic processing to calculate an absolute position using a low speed arithmetic processing device.

Further, in the first rotational angle detector 24, in the case that the magnetic field generated by the first bias magnet 38 in a region including the respective first magnetic detecting elements 36a, 36b undergoes a change due to rotation of the spur gear 34, each of the first magnetic detecting elements 36a, 36b outputs the change in the magnetic field, respectively, as respective first analog signals. The respective first analog signals are signals corresponding to the first angle of rotation. Therefore, on the basis of the respective first analog signals, the arithmetic processing unit 30 is capable of determining with high precision that the absolute position of the rotating shaft 14 at the time of initiation corresponds to the position of a certain numbered tooth of the spur gear 34. Further, since a commercially available spur gear 34 can be used, in comparison with the configurations of Japanese Laid-Open Patent Publication No. 2002-513923 (PCT) and Japanese Laid-Open Patent Publication No. 64-023107, a further reduction in cost of the position detecting device 10 can be realized.

Furthermore, in the second rotational angle detector 26, in the case that the magnetic field generated by rotation of the second bias magnet 40 in a region including the respective second magnetic detecting elements 42a, 42b undergoes a change, each of the second magnetic detecting elements 42a, 42b outputs the change in the magnetic field, respectively, as respective second analog signals. The respective second analog signals are signals corresponding to the second angle of rotation. Therefore, on the basis of the respective second analog signals, the arithmetic processing unit 30 is capable of easily determining that the absolute position of the rotating shaft 14 at the time of initiation corresponds to a certain angle within one rotation of the rotating shaft 14.

Further, in the third rotational angle detector 28, in the case that the magnetic field generated by rotation of the third bias magnet 44 in a region including the respective third magnetic detecting elements 46c, 46d undergoes a change, each of the third magnetic detecting elements 46c, 46d outputs the change in the magnetic field, respectively, as respective third analog signals. In this case, since the speed reducing mechanism 20 rotates the output shaft 22 by decelerating the rotational speed of the rotating body 12 at the predetermined reduction ratio N, on the basis of the respective third analog signals, the arithmetic processing unit 30 is capable of easily determining that the absolute position of the rotating shaft 14 at the time of initiation corresponds to a certain angle within multiple rotations of the rotating shaft 14.

Moreover, since the rotating shaft 14 penetrates through the second bias magnet 40 whereas the output shaft 22 penetrates through the third bias magnet 44, there is a possibility that the detection accuracy of the second angle of rotation and the third angle of rotation in the second rotational angle detector 26 and the third rotational angle detector 28 may be lowered. However, according to the position detecting device 10, the first angle of rotation is detected with high precision by the first rotational angle detector 24 using the spur gear 34. As a result, since lowering of the detection accuracy of the second angle of rotation and the third angle of rotation is compensated for by the high detection accuracy of the first angle of rotation, any influence thereof on the process of calculating the absolute position in the arithmetic processing unit 30 can be suppressed.

Further, the interpolator 32 converts the respective first analog signals into the two-phase first pulse signals, and the arithmetic processing unit 30 calculates the absolute position of the rotating shaft 14 at the time of initiation on the basis of the respective first to third analog signals, and outputs the second pulse signal corresponding to the calculated absolute position. Consequently, the current position counter 54 is capable of easily detecting the current absolute position of the rotating shaft 14 on the basis of the respective first pulse signals output from the interpolator 32, and the second pulse signals output from the arithmetic processing unit 30. Further, regardless of the forward or reverse rotation of the rotating shaft 14, it is possible to ignore the influence of any backlash in the speed reducing mechanism 20.

The backlash of the speed reducing mechanism 20 preferably resides within an angular range of $360°/(2× N)$. Further, as discussed above, correction of any backlash can be handled in accordance with software processing performed by the interpolator 32 and the current position counter 54. In the present embodiment, by providing a mechanism such as a spiral spring, which applies torque in a fixed direction with respect to the output shaft 22 of the speed reducing mechanism 20, corrective processing by software can be rendered unnecessary.

Further, in the position detecting device 10, because the arithmetic processing unit 30 transmits the second pulse signals, in the form of a serial signal representative of the total number of pulses TP corresponding to the absolute position of the rotating shaft 14 at the time of initiation, to the current position counter 54 via the serial communications unit 50, it is possible to further reduce the cost of the position detecting device 10.

Furthermore, at the time of initiation of the position detecting device 10, the current position counter 54 presets the number of total pulses TP. Further, during rotation of the rotating shaft 14, the multiplication circuit 52 produces the multiplied pulse signal on the basis of the first pulse signals. Thus, the current position counter 54, using the preset total number of pulses TP as a reference, counts the number of pulses corresponding to the multiplied pulse signal, whereby the current absolute position of the rotating shaft 14 is detected. As a result, the current absolute position of the rotating shaft 14 can be determined easily and highly efficiently. Further, by supplying the multiplied pulse signal from the multiplication circuit 52 to the current position counter 54, the resolution of the current absolute position of the rotating shaft 14 in the current position counter 54 is improved, and the absolute position can be obtained with high accuracy.

Further, the multiplication circuit 52 determines a forward rotation or a reverse rotation of the rotating shaft 14 by comparing the two-phase first pulse signals, and generates a multiplied pulse signal of the determined forward rotation or reverse rotation. Therefore, the current position counter 54 is capable of accurately determining the current absolute position of the rotating shaft 14.

Furthermore, in the event that the total number of pulses TP is preset in the current position counter 54, the rotating body drive control unit 56 drives the rotating body 12 and causes the rotating shaft 14 to rotate, and therefore, the absolute position of the rotating shaft 14 during rotation thereof can be acquired reliably.

Modified Examples of the Present Embodiment

Next, modified examples (a position detecting device 10A according to the first modified example and a position detecting device 10B according to the second modified example) of the position detecting device 10 according to the present embodiment will be described with reference to FIGS. 10 through 14. Regarding position detecting devices 10A, 10B, constituent elements thereof that are the same as those of the position detecting device 10 described with reference to FIGS. 1 through 9 are denoted by the same reference characters, and detailed description of such features is omitted.

First Modified Example

First, the position detecting device 10A according to the first modified example as the first configuration will be described with reference to FIGS. 10 through 12B.

The position detecting device 10A is different from the position detecting device 10 shown in FIGS. 1 through 9 as the basic configuration in that the rotational angle detecting mechanism 16 includes a first speed reducing mechanism 60, a second speed reducing mechanism 62, a first rotational angle detector 64, and a second rotational angle detector 66.

The first speed reducing mechanism 60 is a rotation transmission mechanism which is capable of decelerating the rotational speed of the rotating shaft 14 of the rotating body 12 and transmitting the decelerated rotational speed to an input shaft 68 of second speed reducing mechanism 62 which also serves as the output shaft of the first speed reducing mechanism 60. In the first modified example, it should be noted that the speed reducing ratio of the first speed reducing mechanism 60 is 1 (one), so that the rotational speed (rotational force) of the rotating shaft 14 is output to the input shaft 68 as it is.

The first speed reducing mechanism 60 is equipped with a first speed reducing unit 60a which is provided on a side of the rotating shaft 14, an intermediate shaft 60b which extends substantially in parallel to the rotating shaft 14, the input shaft 68, and the output shaft 22, and one end of which is connected to the first speed reducing unit 60a, and a second speed reducing unit 60c which is provided on a side of the input shaft 68 and connected to the other end of the intermediate shaft 60b.

The first speed reducing unit 60a is made up from a first gear 70a on an input side which is substantially coaxially attached to the rotating shaft 14, and a second gear 72a on an output side which is substantially coaxially attached to one end side of the intermediate shaft 60b and which engages with the first gear 70a. The second speed reducing unit 60c is made up from a third gear 70b on an input side which is substantially coaxially attached to the other end of the intermediate shaft 60b, and a fourth gear 72b on an output side which is substantially coaxially attached to the input shaft 68 and which engages with the third gear 70b. As described above, since the speed reducing ratio of the first speed reducing mechanism 60 is 1, each of the speed reducing ratios n of the first speed reducing unit 60a and the second speed reducing unit 60c is set such that n=1.

The second speed reducing mechanism 62 has substantially the same configuration as the speed reducing mechanism 20 of the position detecting device 10. The second speed reducing mechanism 62 is equipped with the input shaft 68 which is substantially coaxially arranged with the rotating shaft 14, and to which the rotational force of the rotating shaft 14 is transmitted through the first speed reducing mechanism 60, and the output shaft 22 which is substantially coaxially arranged with the rotating shaft 14 and the input shaft 68, and which rotates at a rotational speed decelerated from the rotational speed of the input shaft 68 by the speed reducing ratio N.

Therefore, in the first modified example, the entire speed reducing ratio of the first speed reducing mechanism 60 and the second speed reducing mechanism 62 is N (=1×N).

The first rotational angle detector 64 is made up from a cylindrical bias magnet 74 which is substantially coaxially attached to a front end side of the rotating shaft 14, and a magnetic detecting element 76 which is arranged in facing relation to the center of the bias magnet 74. In the bias magnet 74, one semicircular portion thereof is allocated to the N-pole, whereas the other semicircular portion thereof is allocated to the S-pole. Thus, the first rotational angle detector 64 is a one-rotation rotational angle detector for detecting a first angle of rotation lying within one rotation of the rotating shaft 14. The magnetic detecting element 76 outputs by way of serial communications to the arithmetic processing unit 30 a serial signal (a signal of the rotational angle data shown in FIG. 12B) corresponding to the first angle of rotation. Also, the magnetic detecting element 76 outputs to the multiplication circuit 52 two-phase digital pulse signals (A-phase and B-phase first pulse signals shown in FIG. 12A), which correspond to the first angle of rotation and whose phases are shifted mutually by 90°.

Figure 12A:
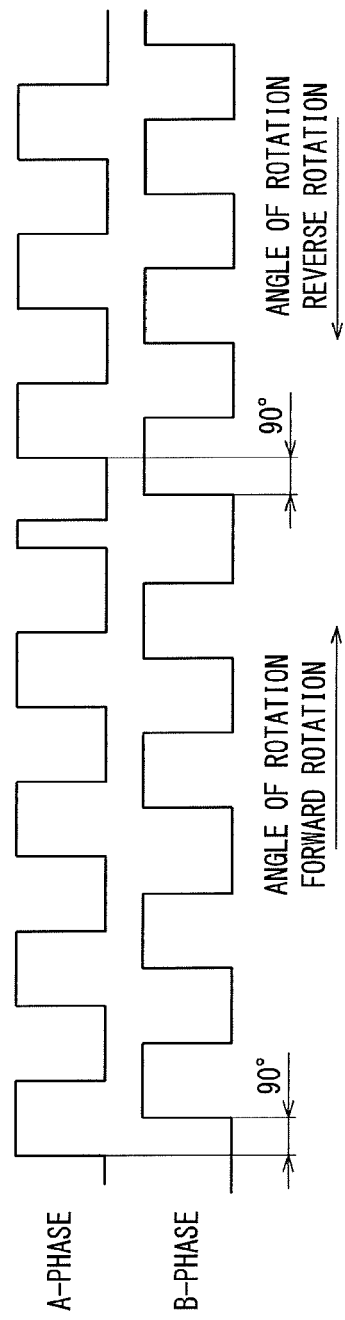
FIG. 12A is a waveform diagram of two-phase first pulse signals output from a magnetic detecting element.
Figure 12B:
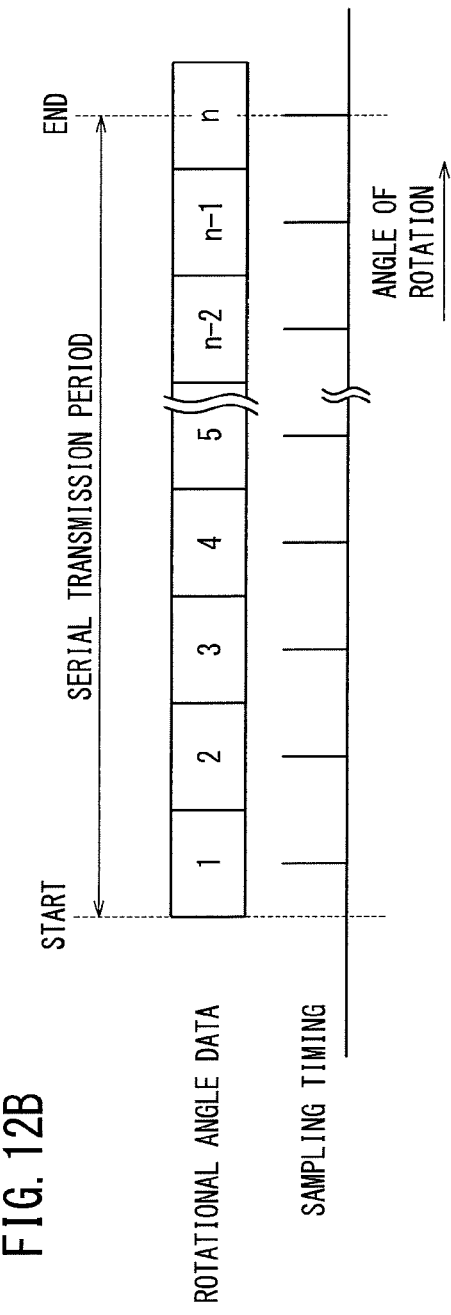
FIG. 12B is a waveform diagram of a serial signal output from the magnetic detecting element.

Stated otherwise, according to the first modified embodiment, the magnetic detecting element 76 has both functions of outputting the serial signal to the arithmetic processing unit 30 and of outputting two-phase first pulse signals to the multiplication circuit 52 as interpolation processing. That is, the position detecting device 10A according to the first modified embodiment exchanges the first rotational angle detector 24 and the second rotational angle detector 26 in the position detecting device 10 with the first rotational angle detector 64. FIG. 12B shows a case in which, during a predetermined time period (serial transmission period), the magnetic detecting element 76 sends a serial signal to the arithmetic processing unit 30. The second rotational angle detector 66 has a configuration similar to the third rotational angle detector 28 (see FIGS. 1 and 2) of the position detecting device 10. The second rotational angle detector 66 detects by the third magnetic detecting elements 46c, 46d the second angle of rotation lying within one rotation of the output shaft 22 corresponding to the multiple rotations of the rotating shaft 14, and outputs analogue signals (similar to the third analogue signal) to the arithmetic processing unit 30, which correspond to the detected second angle of rotation.

The arithmetic processing unit 30 performs sampling of the serial signal from the magnetic detecting element 76 at predetermined sampling intervals shown in FIG. 12B. Further, the arithmetic processing unit 30 converts output voltages of the analog signals from the third magnetic detecting elements 46c, 46d from rectangular coordinates into polar coordinates. Then, the arithmetic processing unit 30 calculates the absolute position of the rotating shaft 14 at the time of initiation, based on the serial signal which is obtained by sampling and the output voltages converted into polar coordinates.

In this case, the arithmetic processing unit 30 calculates the amount of rotation TA of the rotating shaft 14 based on the following equation (4).

$$TA = P1 + (P3 \times N) \quad (4)$$

In the first modified example, since the spur gear 34 is not used, it should be noted that P1 in the equation (4) represents an angle (first angle of rotation) of the rotating shaft 14.

Further, in the first modified example, the total number of pulses TP is calculated by the following equation (5).

$$TP = \text{INT}(TA \times PP \div 360) \quad (5)$$

Figure 8:
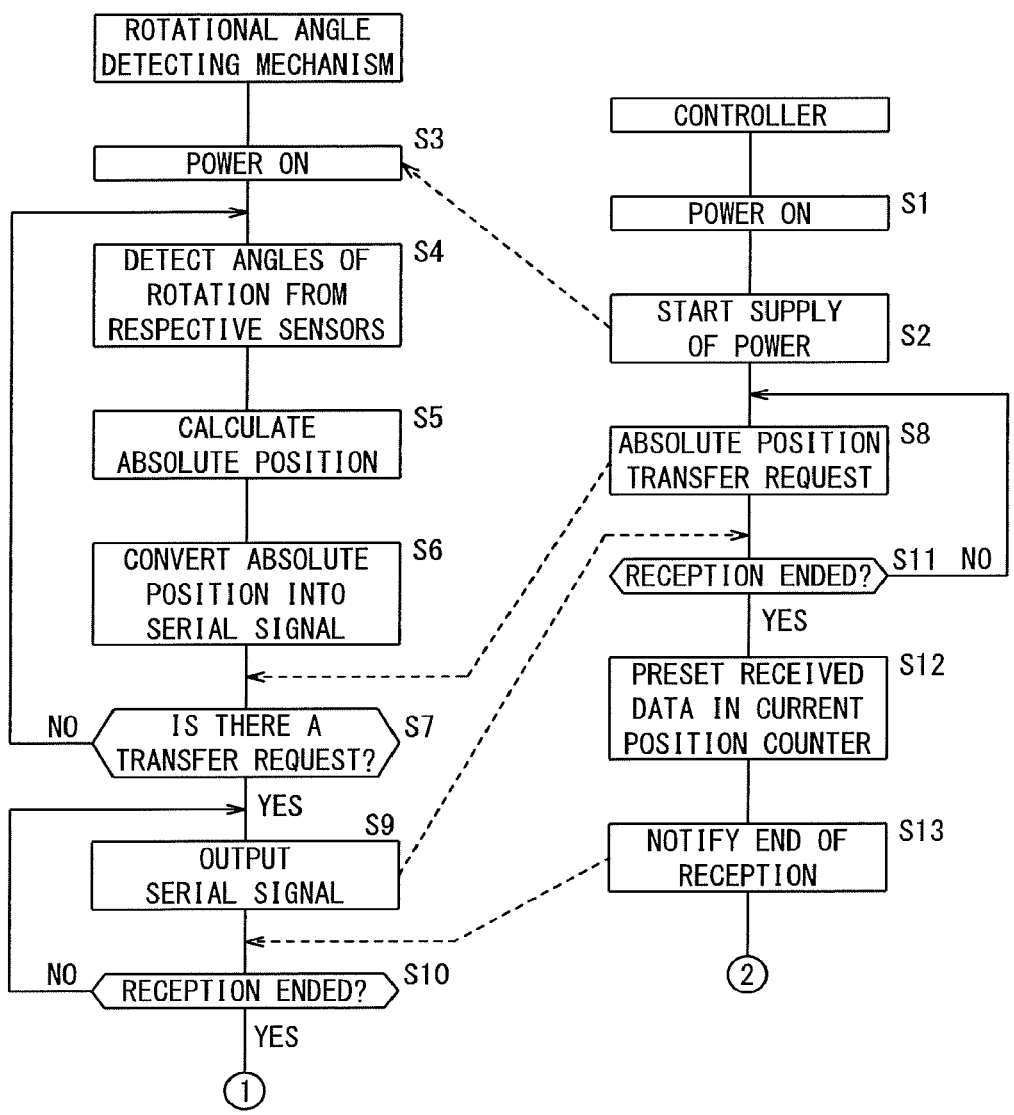
FIG. 8 is a sequence diagram for describing operations of the position detecting device of FIG. 1.
Figure 9:
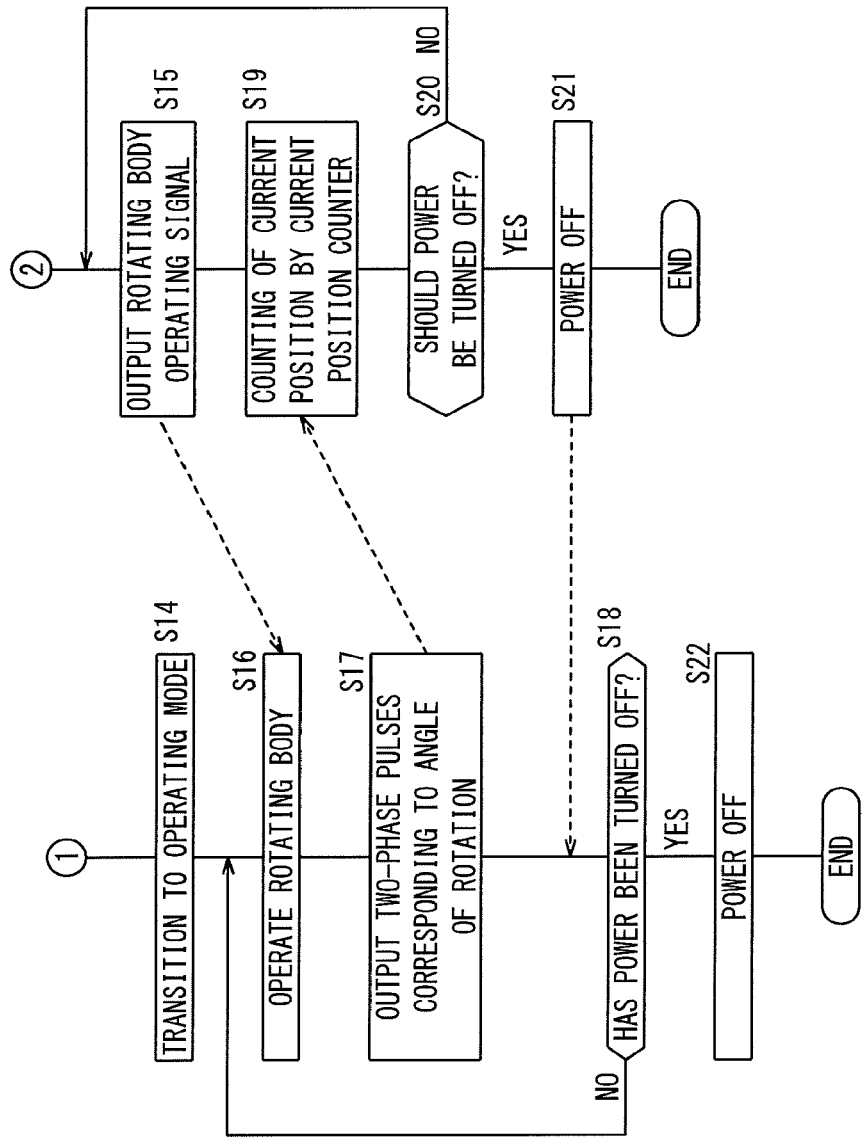
FIG. 9 is a sequence diagram for describing operations of the position detecting device of FIG. 1.
Figure 10:
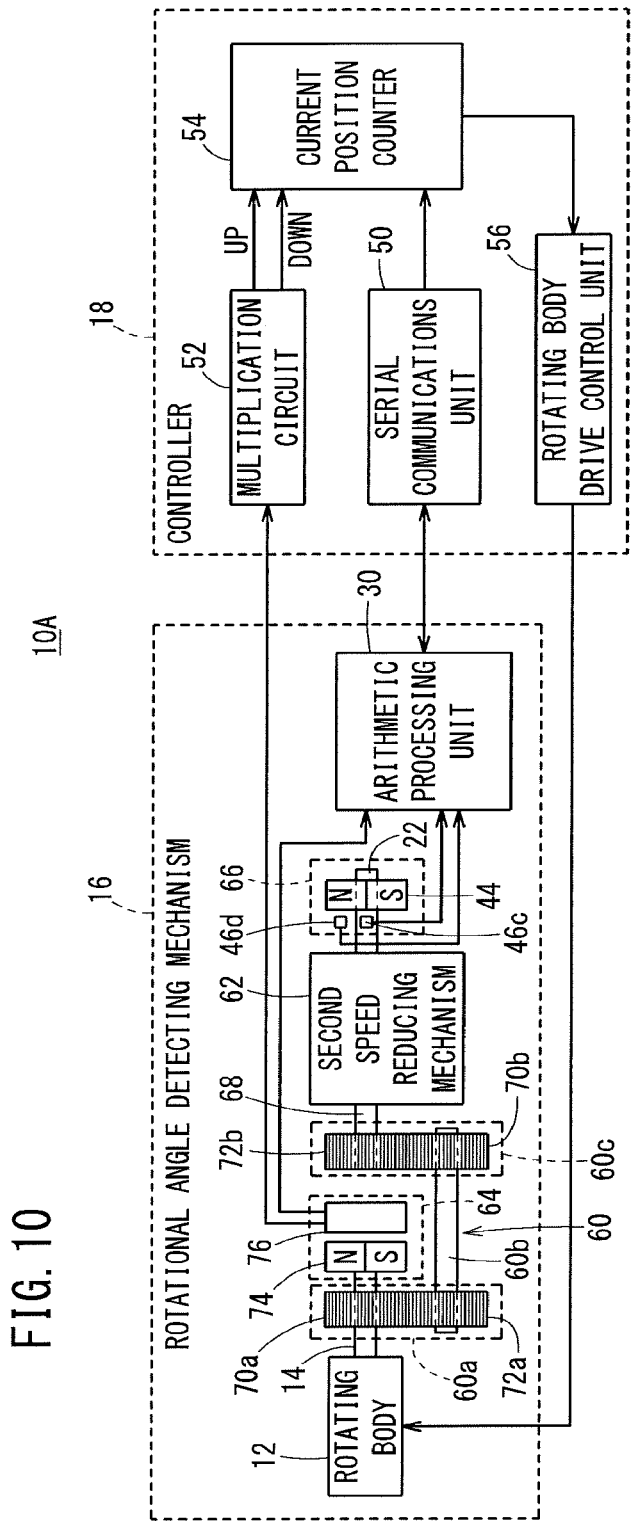
FIG. 10 is a block diagram of a position detecting device according to a first modified example.
Figure 11:
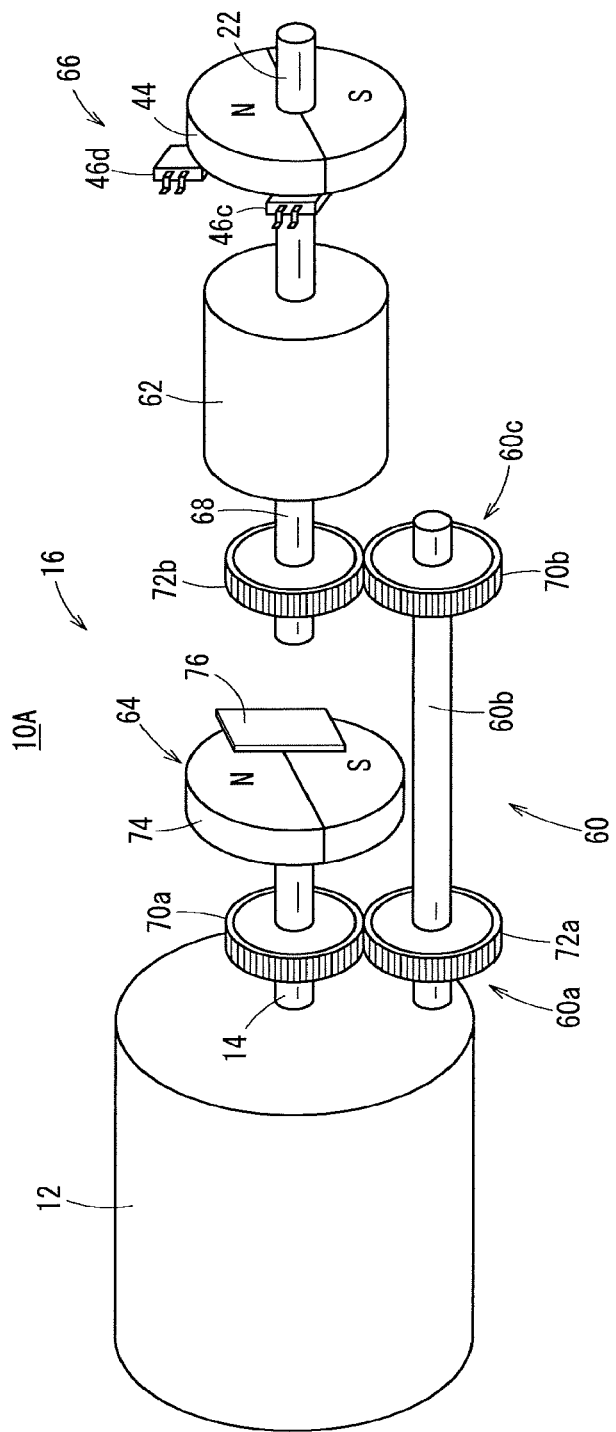
FIG. 11 is a schematic configuration diagram of a rotational angle detecting mechanism of FIG. 10.

The position detecting device 10A according to the first modified example can also operate according to the sequence diagrams shown in FIGS. 8 and 9. In this case, the position detecting device 10A operates similarly to the position detecting device 10, except that, as to steps S4, S5, and S17, the two-phase first pulse signals are directly output from the magnetic detecting element 76 to the multiplication circuit 52, the serial signal is output from the magnetic detecting element 76 to the arithmetic processing unit 30, the analog signals are output from the third magnetic detecting elements 46c, 46d to the arithmetic processing unit 30, and the total number of pulses TP is calculated by the arithmetic processing unit 30 based on the equations (4) and (5). Accordingly, the description of detailed operation will be omitted.

As described above, in the position detecting device 10A according to the first modified example, the magnetic detecting element 76 of the first rotational angle detector 64 has both functions of outputting the serial signal to the arithmetic processing unit 30 and of outputting two-phase first pulse signals to the multiplication circuit 52 of the controller 18 as interpolation processing. Further, the arithmetic processing unit 30 calculates the absolute position of the rotating shaft 14 at the time of initiation, on the basis of the serial signal, and the second angle of rotation detected by (the third magnetic detecting elements 46c, 46d of) the second rotational angle detector 66. Therefore, in the first modified example, the position detecting device 10A can be produced at a reduced cost since the number of parts of the position detecting device 10A is reduced, and computation load in the arithmetic processing unit 30 is reduced. Further, since the cylindrical bias magnet 74 is adopted, the reduction in magnetic flux density is suppressed in comparison with a ring magnet, and the detection accuracy of the first angle of rotation can be improved.

Further, in the position detecting device 10A according to the first modified example as well, the following advantages can be obtained in a similar manner to the case of the position detecting device 10.

That is, the second speed reducing mechanism 62 and the output shaft 22 are disposed along the axial direction of the rotating shaft 14, and by arranging the first rotational angle detector 64 and the second rotational angle detector 66 around the rotating shaft 14 and the output shaft 22, the size in the radial direction of the rotating shaft 14 can be reduced.

Furthermore, the arithmetic processing unit 30 calculates the absolute position of the rotating shaft 14 in a stopped state at a time of initiation, on the basis of the first and second angles of rotation, only at the time of initiation. As a result, during rotation of the rotating shaft 14, (the current position counter 54 of) the controller 18 is capable of determining in a pseudo manner and easily the current absolute position of the rotating shaft 14, from the two-phase first pulse signals, taking as a standard the absolute position of the rotating shaft 14 at the time of initiation.

More specifically, the position detecting device 10A functions as an absolute type rotary encoder only at the time of initiation, and thereafter, functions as an incremental type rotary encoder. Thus, calculating the absolute position in real time is rendered unnecessary, and thus, it is possible to use a low speed and low cost CPU.

As a result, if such a position detecting device 10A is installed in an electric actuator or the like, it becomes possible to shorten the tact time.

Thus, in accordance with the first modified example as well, it is possible to realize a smaller scale and a reduction in cost of the position detecting device 10A, together with carrying out arithmetic processing to calculate an absolute position using a low speed arithmetic processing device.

Furthermore, in accordance with the first modified example as well, regardless of the forward or reverse rotation of the rotating shaft 14, it is possible to ignore the influence of any backlash in the first speed reducing mechanism 60 and the second speed reducing mechanism 62. The backlash of the first speed reducing mechanism 60 preferably resides within an angular range of 360°/(4× n× n). In the first modified example, n=1. Thus, it is preferable that the backlash resides within an angular range of 90°.

The position detecting device 10A further includes the first speed reducing mechanism 60 which transmits the rotational force of the rotating shaft 14 to the input shaft 68 of the second speed reducing mechanism 62, wherein the rotating shaft 14, the input shaft 68, and the output shaft 22 are arranged substantially coaxially. Though the position detecting device 10A becomes slightly large in the radial direction due to the first speed reducing mechanism 60, the number of parts of the position detecting device 10A is reduced because the first rotational angle detector 64 having the interpolation function is used. Thus, it is possible to realize a reduction in cost of the entire device. In the description above, a case is described in which the first speed reducing mechanism 60 having the speed reducing ratio of 1 is used. Alternatively, instead of the first speed reducing mechanism 60, various types of rotation transmission mechanisms such as rotation transmission means using belts can be preferably adopted.

Second Modified Example

Figure 13:
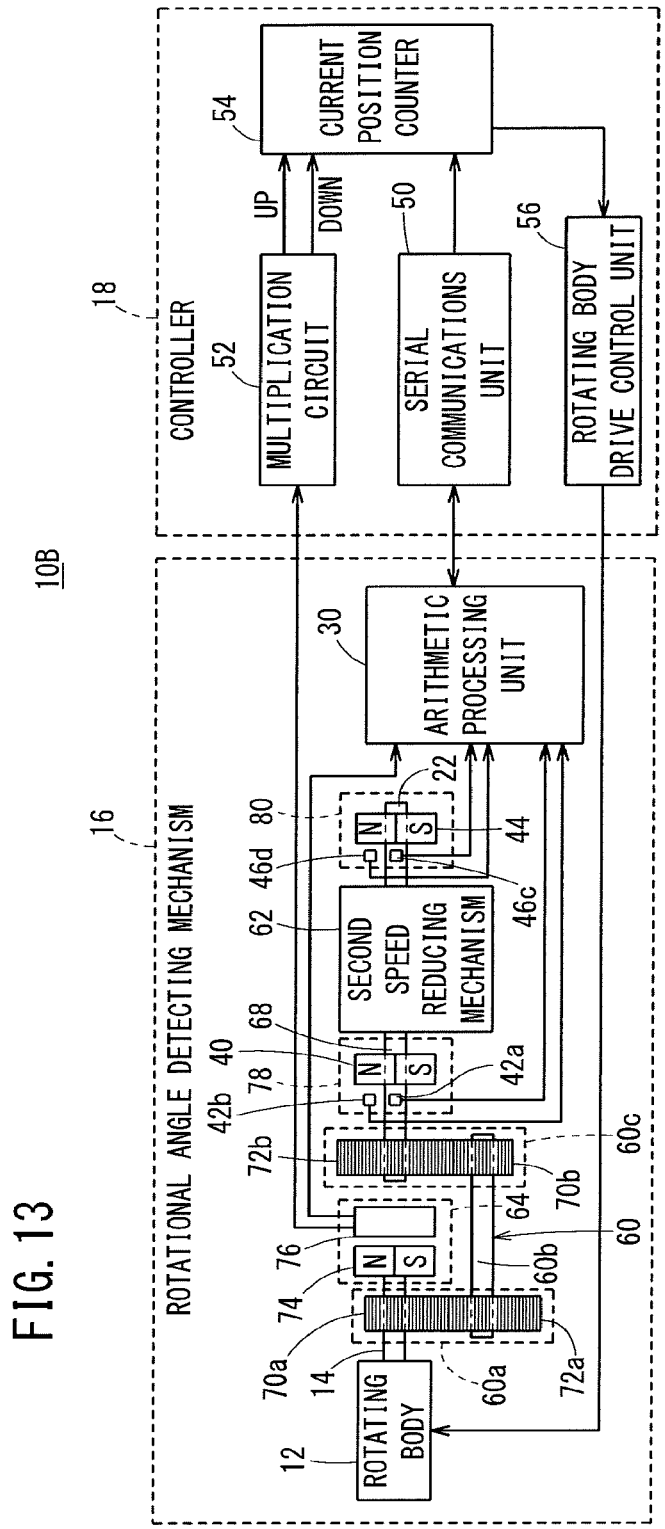
FIG. 13 is a block diagram of a position detecting device according to a second modified example.
Figure 14:
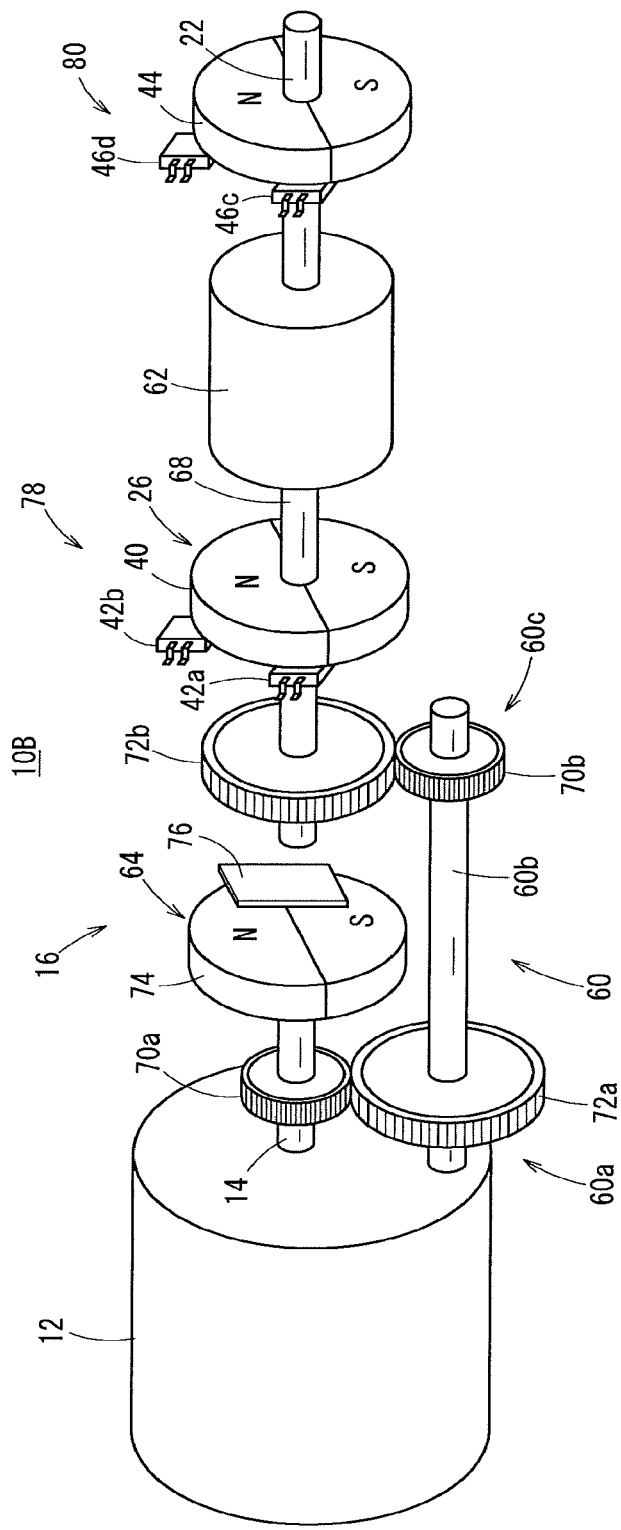
FIG. 14 is a schematic configuration diagram of a rotational angle detecting mechanism of FIG. 13.

Next, the position detecting device 10B according to the second modified example as the second configuration will be described with reference to FIGS. 13 and 14.

The position detecting device 10B is different from the configuration of the position detecting device 10A according to the first modified example (see FIGS. 10 and 11) in that the rotational angle detecting mechanism 16 includes first to third rotational angle detector 64, 78, 80 and that each of the speed reducing ratios n of the first speed reducing unit 60a and the second speed reducing unit 60c of the first speed reducing mechanism 60 is more than 1. Thus, the entire speed reducing ratio of the first speed reducing mechanism 60 and the second speed reducing mechanism 62 becomes n×n×N (first speed reducing unit 60a: n; second speed reducing unit 60c: n; second speed reducing mechanism 62: N). As a result, the rotational speed of the output shaft 22 becomes a rotational speed which is decelerated from the rotational speed of the rotating shaft 14 by (1/n)×(1/n)×(1/N).

The second rotational angle detector 78 has a configuration substantially similar to the second rotational angle detector 26 (see FIGS. 1 and 2) of the position detecting device 10. It should be noted, however, that the second rotational angle detector 78 is provided for the input shaft 68 instead of the rotating shaft 14. That is, in the second modified example, the first speed reducing mechanism 60 having a speed reducing ratio n×n is provided between the rotating shaft 14 and the input shaft 68. Therefore, the second magnetic detecting elements 42a, 42b of the second rotational angle detector 78 can detect a second angle of rotation lying within one rotation of the input shaft 68 and corresponding to multiple rotations of the rotating shaft 14.

The third rotational angle detector 80 has a configuration similar to the second rotational angle detector 66 (see FIGS. 10 and 11) of the position detecting device 10A. The third magnetic detecting elements 46c, 46d of the third rotational angle detector 80 can detect a third angle of rotation lying within one rotation of the output shaft 22 and corresponding to multiple rotations of the rotating shaft 14.

The arithmetic processing unit 30 performs sampling of the serial signal from the magnetic detecting element 76 at predetermined sampling intervals shown in FIG. 12B. Further, the arithmetic processing unit 30 converts output voltages of the respective analog signals (similar to the second analog signal) corresponding to the second angle of rotation from the second magnetic detecting elements 42a, 42b, and the analog signals (similar to the third analog signal) corresponding to the third angle of rotation from the third magnetic detecting elements 46c, 46d, from rectangular coordinates into polar coordinates. Then, the arithmetic processing unit 30 calculates the absolute position of the rotating shaft 14 at the time of initiation, based on the serial signal which is obtained by sampling and the output voltages converted into polar coordinates.

In this case, the arithmetic processing unit 30 calculates the amount of rotation TA of the rotating shaft 14 based on the following equation (6).

$$TA = P1 + (P2 \times n \times n) + (P3 \times N \times n \times n) \quad (6)$$

In the second modified example, since the spur gear 34 is not used, and since the second rotational angle detector 78 is arranged for the input shaft 68, it should be noted that in the equation (6), P1 represents an angle (first angle of rotation) of the rotating shaft 14 and P2 represents an angle (second angle of rotation) of the input shaft 68. Further, in the second modified example, the total number of pulses TP is calculated by the equation (5) described above.

In a similar manner to the case of the position detecting device 10A, the position detecting device 10B according to the second modified example can also operate according to the sequence diagrams shown in FIGS. 8 and 9. In this case as well, the position detecting device 10B operates similarly to the position detecting device 10, except that, as to steps S4, S5, and S17, the two-phase first pulse signals are directly output from the magnetic detecting element 76 to the multiplication circuit 52, the serial signal is output from the magnetic detecting element 76 to the arithmetic processing unit 30, the analog signals are output from the second magnetic detecting elements 42a, 42b and the third magnetic detecting elements 46c, 46d to the arithmetic processing unit 30, and the total number of pulses TP is calculated by the arithmetic processing unit 30 based on the equations (5) and (6). Accordingly, the description of detailed operation will be omitted.

As described above, compared with the position detecting device 10A according to the first modified example, the position detecting device 10B according to the second modified example is equipped with three rotational angle detectors (first to third rotational angle detectors 64, 78, 80), and two speed reducing mechanisms (first speed reducing mechanism 60 and second speed reducing mechanism 62) having speed reducing ratios n, N, each of which is more than 1. Thus, compared with the position detecting device 10A, the number of parts is large, and computation load in the arithmetic processing unit 30 is large, resulting in high cost.

In the second modified example, however, the second rotational angle detector 78 and the third rotational angle detector 80 respectively detects the second angle of rotation and the third angle of rotation corresponding to multiple rotations of the rotating shaft 14, and the arithmetic processing unit 30 is capable of calculating the absolute position of the rotating shaft 14 at the time of initiation with high precision, using the detected second and third angles of rotation, etc. As a result, compared with conventional position detecting devices, the absolute position can be calculated with high precision and the cost can be reduced. Further, in the second modified example as well, since the cylindrical bias magnet 74 is adopted, the reduction in magnetic flux density is suppressed in comparison with a ring magnet, and the detection accuracy of the first angle of rotation can be improved.

Furthermore, since the position detecting device 10B according to the second modified example is also equipped with the first to third rotational angle detectors 64, 78, 80, advantageous effects similar to the position detecting device 10 can be obtained.

The present invention is not limited to the embodiment described above, and it goes without saying that various modified or additional configurations could be adopted therein without departing from the essence and gist of the present invention as set forth in the appended claims.

What is claimed is:

1. A position detecting device including a speed reducing mechanism connected to a rotating shaft of a rotating body, and configured to detect an absolute position of the rotating shaft, on a basis of an angle of rotation of the rotating shaft and an angle of rotation of an output shaft of the speed reducing mechanism, comprising:
   a first rotational angle detector configured to detect a first angle of rotation in a pitch interval of a gear attached substantially coaxially to the rotating shaft;
   a second rotational angle detector configured to detect a second angle of rotation lying within one rotation of the rotating shaft;
   a third rotational angle detector configured to detect a third angle of rotation lying within one rotation of the output shaft and corresponding to multiple rotations of the rotating shaft;
   an arithmetic processing unit configured to calculate an absolute position of the rotating shaft at a time of initiation of the position detecting device, on a basis of the first to third angles of rotation detected respectively by the first to third rotational angle detectors at the time of initiation; and
   a current position detecting unit configured to detect a current absolute position of the rotating shaft during rotation of the rotating shaft upon driving of the rotating body, on a basis of the first angle of rotation detected by the first rotational angle detector, and the absolute position of the rotating shaft at the time of initiation.

2. The position detecting device according to claim 1, wherein:
   the first rotational angle detector comprises a spur gear made up from a magnetic material and attached substantially coaxially with the rotating shaft, two first magnetic detecting elements disposed in facing relation to the spur gear, and with phases shifted mutually by 90°, in a case that an interval between tooth ends of the spur gear is defined as one cycle, and a first bias magnet; and the first magnetic detecting elements are configured to output first analog signals, respectively, corresponding to the first angle of rotation, and whose phases are shifted mutually by 90°.

3. The position detecting device according to claim 2, wherein:

the second rotational angle detector comprises a ring shaped second bias magnet attached substantially coaxially with the rotating shaft, and two second magnetic detecting elements disposed in facing relation to the second bias magnet, and with phases shifted mutually by 90°, in a case that one rotation of the rotating shaft is defined as one cycle; and the second magnetic detecting elements are configured to output second analog signals, respectively, corresponding to the second angle of rotation, and whose phases are shifted mutually by 90°.

4. The position detecting device according to claim 3, wherein:

the third rotational angle detector comprises a ring shaped third bias magnet attached substantially coaxially with the output shaft, and two third magnetic detecting elements disposed in facing relation to the third bias magnet, and with phases shifted mutually by 90°, in a case that one rotation of the output shaft is defined as one cycle; and the third magnetic detecting elements are configured to output third analog signals, respectively, corresponding to the third angle of rotation, and whose phases are shifted mutually by 90°.

5. The position detecting device according to claim 4, further comprising an interpolator configured to convert the respective first analog signals output respectively by each of the first magnetic detecting elements into two-phase first pulse signals;

wherein the arithmetic processing unit is configured to calculate the absolute position of the rotating shaft at the time of initiation, based on each of the first to third analog signals output respectively by the first to third rotational angle detectors, and output a second pulse signal corresponding to the calculated absolute position; and the current position detecting unit is configured to detect the current absolute position of the rotating shaft on a basis of the first pulse signals output from the interpolator, and the second pulse signal output from the arithmetic processing unit.

6. The position detecting device according to claim 5, wherein the arithmetic processing unit is configured to transmit the second pulse signal to the current position detecting unit as a serial signal including a number of pulses corresponding to the absolute position of the rotating shaft at the time of initiation.

7. The position detecting device according to claim 6, further comprising a multiplication circuit configured to generate a multiplied pulse signal obtained by multiplying each of the first pulse signals, and output the multiplied pulse signal to the current position detecting unit;

wherein the current position detecting unit is a current position counter, which is configured to preset a number of pulses corresponding to the serial signal at the time of initiation, and during rotation of the rotating shaft, configured to count the number of pulses corresponding to the multiplied pulse signal from the preset number of pulses, thereby detecting the current absolute position of the rotating shaft.

8. The position detecting device according to claim 7, wherein the multiplication circuit is configured to determine a forward rotation or a reverse rotation of the rotating shaft by comparing the respective first pulse signals, and generate the multiplied pulse signal of the determined forward rotation or reverse rotation.

9. The position detecting device according to claim 7, further comprising a rotating body drive control unit configured to rotate the rotating shaft by driving the rotating body, in an event that the number of pulses corresponding to the serial signal is preset in the current position counter.

10. A position detecting device including a speed reducing mechanism connected to a rotating shaft of a rotating body, and configured to detect an absolute position of the rotating shaft, on a basis of an angle of rotation of the rotating shaft and an angle of rotation of an output shaft of the speed reducing mechanism, comprising:

a first rotational angle detector configured to detect a first angle of rotation lying within one rotation of the rotating shaft;

a second rotational angle detector configured to detect a second angle of rotation lying within one rotation of the output shaft and corresponding to multiple rotations of the rotating shaft;

an arithmetic processing unit configured to calculate an absolute position of the rotating shaft at a time of initiation of the position detecting device, on a basis of the first angle of rotation and the second angle of rotation detected respectively by the first rotational angle detector and the second rotational angle detector at the time of initiation; and a current position detecting unit configured to detect a current absolute position of the rotating shaft during rotation of the rotating shaft upon driving of the rotating body, on a basis of the first angle of rotation detected by the first rotational angle detector, and the absolute position of the rotating shaft at the time of initiation, wherein the first rotational angle detector comprises a cylindrical bias magnet which is substantially coaxially attached to the rotating shaft, and a magnetic detecting element which is arranged in facing relation to the bias magnet, and the magnetic detecting element is configured to output to the arithmetic processing unit a serial signal corresponding to the first angle of rotation, and further output to the current position detecting unit two-phase pulse signals which correspond to the first angle of rotation and whose phases are shifted mutually by 90°.

11. The position detecting device according to claim 10, further comprising a rotation transmission mechanism configured to transmit a rotational force of the rotating shaft to an input shaft of the speed reducing mechanism, wherein the rotating shaft, the input shaft, and the output shaft are arranged substantially coaxially.

12. A position detecting device including a speed reducing mechanism connected to a rotating shaft of a rotating body, and configured to detect an absolute position of the rotating shaft, on a basis of an angle of rotation of the rotating shaft and an angle of rotation of an output shaft of the speed reducing mechanism, comprising:

a first rotational angle detector configured to detect a first angle of rotation lying within one rotation of the rotating shaft;

a first speed reducing mechanism configured to decelerate and output a rotational speed of the rotating shaft;

a second speed reducing mechanism including an input shaft connected to the first speed reducing mechanism, and configured to further decelerate the rotational speed of the rotating shaft which has been decelerated by the first speed reducing mechanism and to output the further decelerated rotational speed to the output shaft;

a second rotational angle detector configured to detect a second angle of rotation lying within one rotation of the input shaft and corresponding to multiple rotations of the rotating shaft;

a third rotational angle detector configured to detect a third angle of rotation lying within one rotation of the output shaft and corresponding to the multiple rotations of the rotating shaft;

an arithmetic processing unit configured to calculate an absolute position of the rotating shaft at a time of initiation of the position detecting device, on a basis of the first to third angles of rotation detected respectively by the first to third rotational angle detectors at the time of initiation; and a current position detecting unit configured to detect a current absolute position of the rotating shaft during rotation of the rotating shaft upon driving of the rotating body, on a basis of the first angle of rotation detected by the first rotational angle detector, and the absolute position of the rotating shaft at the time of initiation, wherein the first rotational angle detector comprises a cylindrical bias magnet which is substantially coaxially attached to the rotating shaft, and a magnetic detecting element which is arranged in facing relation to the bias magnet, and the magnetic detecting element is configured to output to the arithmetic processing unit a serial signal corresponding to the first angle of rotation, and further output to the current position detecting unit two-phase pulse signals which correspond to the first angle of rotation and whose phases are shifted mutually by 90°.

* * * * *